United States Patent
Sun

(10) Patent No.: US 9,028,622 B2
(45) Date of Patent: May 12, 2015

(54) METHOD AND APPARATUS FOR CLEANING A FILM SEPERATING DEVICE

(75) Inventor: Youfeng Sun, Beijing (CN)

(73) Assignee: Beijing Ecojoy Water Technology Co., Ltd., Beijing (CN)

( * ) Notice: Subject to any disclaimer, the term of this patent is extended or adjusted under 35 U.S.C. 154(b) by 553 days.

(21) Appl. No.: 12/995,383

(22) PCT Filed: May 8, 2009

(86) PCT No.: PCT/CN2009/071687
§ 371 (c)(1),
(2), (4) Date: Nov. 30, 2010

(87) PCT Pub. No.: WO2009/143740
PCT Pub. Date: Dec. 13, 2009

(65) Prior Publication Data
US 2011/0067737 A1    Mar. 24, 2011

(30) Foreign Application Priority Data

May 30, 2008  (CN) .......................... 2008 1 0113983

(51) Int. Cl.
*B01D 65/02* (2006.01)
*B01D 61/18* (2006.01)
*B01D 61/22* (2006.01)

(52) U.S. Cl.
CPC .......... *B01D 65/02* (2013.01); *B01D 2321/164* (2013.01); *B01D 61/18* (2013.01); *B01D 61/22* (2013.01); *B01D 2321/02* (2013.01); *B01D 2321/04* (2013.01); *B01D 2321/16* (2013.01); *B01D 2321/185* (2013.01); *B01D 2321/28* (2013.01)

(58) Field of Classification Search
None
See application file for complete search history.

(56) References Cited

U.S. PATENT DOCUMENTS

| | | | | |
|---|---|---|---|---|
| 5,647,988 A | * | 7/1997 | Kawanishi et al. | 210/636 |
| 6,090,275 A | * | 7/2000 | Cheng | 210/90 |
| 6,159,373 A | | 12/2000 | Beck et al. | |
| 2004/0139992 A1 | * | 7/2004 | Murkute et al. | 134/37 |
| 2007/0187326 A1 | | 8/2007 | Bonnelye et al. | |

(Continued)

FOREIGN PATENT DOCUMENTS

| | | |
|---|---|---|
| CN | 1159769 A | 9/1997 |
| CN | 1221648 A | 7/1999 |
| CN | 2530940 Y | 1/2003 |

(Continued)

OTHER PUBLICATIONS

English Machine Translation of CN 1548219 A.*

(Continued)

*Primary Examiner* — Nicole Blan
(74) *Attorney, Agent, or Firm* — Patterson, Thuente, Pedersen, P.A.

(57) ABSTRACT

A method for cleaning a film separating device involves: a) performing positive-direction water cleaning when the ratio between the film filter resistance and the preliminary film filter resistance is less than 1.2; b) performing reverse water cleaning when the ratio between the film filter resistance and the preliminary film filter resistance is greater-than or equal-to 1.2; c) performing reverse chemical cleaning when the ratio between the film filter resistance and the preliminary film filter resistance is greater-than or equal-to 2; d) performing positive-direction chemical cleaning when the ratio between the film filter resistance and the preliminary film filter resistance is greater-than or equal-to 3.

20 Claims, 9 Drawing Sheets

(56) References Cited

U.S. PATENT DOCUMENTS

2008/0099399 A1 * 5/2008 Skinner et al. ............... 210/636
2008/0203016 A1   8/2008 Johnson et al.

FOREIGN PATENT DOCUMENTS

| | | | |
|---|---|---|---|
| CN | 2555921 | Y | 6/2003 |
| CN | 1476923 | A | 2/2004 |
| CN | 1490252 | A | 4/2004 |
| CN | 1491904 | A | 4/2004 |
| CN | 2647418 | Y | 10/2004 |
| CN | 1548219 | A * | 11/2004 |
| CN | 1695776 | A | 11/2005 |
| CN | 1772355 | A * | 5/2006 |
| CN | 1820829 | A * | 8/2006 |
| CN | 1946472 | A | 4/2007 |
| CN | 101058057 | A | 10/2007 |
| CN | 101098746 | A | 1/2008 |
| CN | 101284213 | A | 10/2008 |
| JP | 6-190250 | | 7/1994 |
| JP | 7-171358 | | 7/1995 |

OTHER PUBLICATIONS

English Machine Translation of CN 1820829 A.*
English Machine Translation of CN 1772355 A.*

* cited by examiner

METHOD AND APPARATUS FOR CLEANING A FILM SEPERATING DEVICE

PRIORITY CLAIM

The present application is a National Phase entry of PCT Application No. PCT/CN2009/071687, filed May 8, 2009, which claims the priority to Chinese patent application No. 200810113983.4, filed with the Chinese Intellectual Property Office on May 30, 2008 and titled "Method and apparatus for cleaning membrane separation device", the disclosures of which are hereby incorporated by reference in their entirety.

FIELD OF THE INVENTION

The present invention relates to the field of water treatment technologies and in particular to a method and an apparatus for cleaning a membrane separation device.

BACKGROUND OF THE INVENTION

With the development of membrane science and technology and the innovation of water treatment technologies in recent years, membrane separation technology and membrane separation devices based on membrane separation technology have been widely adopted in the field of water treatment. As their applications become more popular and manufacturing technologies mature, the price of membrane separation devices have dropped. In general, however, one-time investment and operating costs for membrane-based water treatment technology are still considerably higher than conventional water treatment technologies. Particularly, due to their short lifespan, the replacement cycle of membrane separation devices is short, resulting in high depreciation expense of industrial applications of membrane-based water treatment, which largely restricts the application range of membrane separation technology in the field of water treatment.

Nowadays, membrane fouling is considered in the art as a major cause of the short lifespan of membrane separation devices. Membrane fouling is defined as reversible or irreversible deposition (including adsorption, clogging, sedimentation and filter cake formation) of substances such as particles, gels, emulsions, suspensions, large molecules and salts on a membrane surface or in a membrane pore. Microscopic details of membrane fouling are complex, especially when the membrane separation device is used to separate biomass and water in a wastewater treatment system, e.g., Membrane Bioreactor (MBR). At present, it is believed by the theorists in the art that the causes of membrane fouling include concentration polarization, pore clogging, gel layer, cake layer and mineral scaling. Concentration polarization and pore clogging generally occur several seconds or minutes after filtration starts. The gel layer forms gradually several minutes or hours afterwards, but its further thickening is slow. Therefore, in the early stage of membrane separation, filtering resistance increases rapidly, but enters a relatively slowly increasing phase afterwards, which mainly includes membrane fouling that results from cake layer formation and mineral scaling. The development of mineral scaling is slow; however, if the cake layer thickens rapidly, the filtering resistance will greatly increase again, which may even make the membrane to lose its water producing capability. Substances that may cause membrane fouling can be classified as: (1) particles, e.g., suspensions in raw water and floccules (consisting of microorganisms) in a membrane bioreactor, which generally cause cake layer formation; (2) large molecules of soluble organic compounds, e.g., soluble organic compounds in raw water, Soluble Microbial Products (SMPs) and Extra-Cellular Polymers (ECPs) accumulated in MBRs and some microorganisms, which generally cause pore clogging and gel layer formation; and (3) inorganic compounds, e.g., carbonates and sulfates in raw water, which generally cause mineral scaling.

Membrane fouling is inevitable in use of membrane separation devices. Therefore, while conducting studies on its formation mechanism and affecting factors, researchers are also seeking for an economic and effective solution for preventing and removing membrane fouling. At present in practice, when membrane fouling develops to a certain extent, an online or offline cleaning measure is to be taken on the membrane separation device to recover filtering performance of the membrane. The cleaning measure can be classified as physical methods and chemical methods. The physical methods include forward hydraulic cleaning which uses a gas, water or gas-water mixture to wash the normal working surface of the membrane, reverse hydraulic cleaning which uses a gas, water or gas-water mixture to permeate the membrane in a direction opposite to the normal working filtering direction of the membrane, and cleaning of the membrane based on ultrasonic waves, etc. The chemical methods mainly include forward chemical cleaning which uses a cleaning solution containing a chemical agent at a certain concentration to soak the normal working surface of the membrane, and reverse chemical cleaning which permeates the membrane in a direction opposite to the normal working filtering direction of the membrane. More information regarding the methods based on forward and reverse hydraulic cleaning can be found in Chinese patents and patent applications 95194986.1, 98125099.8, 02205772.2, 02224060.8, 200320110568.6, 200510013249.7 and 200580013230.0; more information regarding the methods based on reverse chemical cleaning can be found in Chinese patent 200510115862.X. And Chinese patent applications 200580046369.5 and 200610011310.9 provide a method which combines forward and reverse hydraulic cleaning and chemical cleaning.

Forward hydraulic cleaning prevents deposition of particles on the membrane surface mainly by a hydraulic shear force resulting from cross flow of a gas, water or gas-water mixture on the normal working surface of the membrane, which may control membrane fouling caused by the cake layer to a certain extent. But it has no significant effect in controlling the development of the gel layer due to deposition of gel substances on the membrane surface, and has no effect at all in controlling pore clogging due to gels and small molecules. Consequently, using solely forward hydraulic cleaning can not maintain a good cleaning effect in a long term. Moreover, in order to enhance the effect of forward hydraulic cleaning and to keep the water treatment plant's production process from being affected by membrane cleaning, the membrane separation device generally operates intermittently, with inoperative time being approximately 20% of the total time. The cross flow of the gas, water or gas-water mixture is continuous, hence, when the membrane separation device halts, the force that attaches the particles to the membrane surface disappears instantaneously, and some of the deposited particles may return to the liquid-phase body. This method is called "keeping aerating while no sucking" and has been widely adopted in MBRs that obtain the membrane permeating liquid in a negative pressure based manner. Rapid development of membrane fouling can be controlled to a certain extent, however, this cleaning effect is limited and is achieved with increased power consumption for speeding up the cross flow and reduced operating time of the membrane, which result in increased operating costs of the system, more membrane separation devices to be configured, and increased construction costs of the system.

The essential of reverse hydraulic cleaning and reverse chemical cleaning is to use a gas, cleaning water or cleaning solution containing a certain chemical agent to permeate the membrane in a direction opposite to the normal working filtering direction of the membrane, which may remove membrane fouling resulting from pore clogging to a certain extent. However, the gas, cleaning water or cleaning solution can not wash or soak the surface of the membrane that is in contact with the liquid to be filtered while the membrane is in its normal operation, where the gel layer and cake layer, as two major forms of membrane fouling, form and develop, thereby greatly degrading the filtering performance of the membrane. Conventional reverse hydraulic cleaning and reverse chemical cleaning can only act on the other surface opposite to the surface of the membrane that is in contact with the liquid to be filtered while the membrane is in its normal operation, and therefore can not achieve a good cleaning effect. Moreover, reverse hydraulic cleaning and reverse chemical cleaning generally use the membrane permeating liquid of the membrane separation device, i.e., the end product of the water treatment system, as the cleaning water or the solvent, which degrades the actual water producing capability of the membrane separation device to a certain extent, requires more membrane separation devices to meet a designated processing scale, and increases construction costs of the system.

Chinese patent applications 200580046369.5 and 200610011310.9 provide a cleaning method which uses concurrently forward hydraulic cleaning, reverse hydraulic cleaning, forward chemical cleaning and reverse chemical cleaning in a continuous period of time. This cleaning method can achieve a good membrane fouling removing effect. However, said period of time is generally long, during which the membrane separation device can not operate normally, and the water treatment plant is put in a standby or halt state. Meanwhile, reverse hydraulic cleaning or reverse chemical cleaning itself consumes a certain amount of the end product water. Therefore, if this cleaning method is applied frequently, the actual utilization of the membrane separation device and the water producing rate of the system will be greatly reduced, and more membrane separation devices have to be configured to meet a designated processing scale, thereby increasing construction costs of the system. And if this cleaning method is applied infrequently, then good filtering performance of the membrane separation device can not be maintained in a long term; and the duration of cleaning or the concentration of the chemical agent has to be extended or increased, otherwise, the filtering performance can not be thoroughly recovered. This cleaning method involves too many steps, is not well-planned and uses too much cleaning solution and chemical agent, thereby restricting its applications in actual water treatment.

SUMMARY OF THE INVENTION

An object of the invention is to provide a method and an apparatus for cleaning a membrane separation device, by which a filter unit in the membrane separation device can maintain a good filtering performance in a long term during water treatment with an improved utilization of the membrane separation device and less amounts of a cleaning solution and a chemical agent used.

To realize the foregoing object of the invention, the invention provides the following technical solutions.

A method for cleaning a membrane separation device, includes the processes of:

a) performing forward hydraulic cleaning to have a gas, liquid or gas-liquid mixture wash an outer surface of a filter unit at a predetermined velocity, when the ratio of membrane filtering resistance to an initial membrane filtering resistance is smaller than 1.2;

b) performing reverse hydraulic cleaning to have a gas, liquid or gas-liquid mixture permeate the filter unit in a direction opposite to a normal working filtering direction of the filter unit at a predetermined flux and a predetermined duration, when the ratio of the membrane filtering resistance to the initial membrane filtering resistance is larger than or equal to 1.2;

c) performing reverse chemical cleaning to have a cleaning solution containing a chemical agent permeate the filter unit in the direction opposite to the normal working filtering direction of the filter unit at a predetermined flux and a predetermined duration, when the ratio of the membrane filtering resistance to the initial membrane filtering resistance is larger than or equal to 2; and d) performing forward chemical cleaning to have a cleaning solution containing a chemical agent soak the outer surface of the filter unit for a period of time, when the ratio of the membrane filtering resistance to the initial membrane filtering resistance is larger than or equal to 3.

Preferably, the forward hydraulic cleaning in process a) is realized by: having the membrane separation device operate in a cross-flow filtration mode; and using continuously cross flow of the gas, liquid or gas-liquid mixture on the outer surface of the filter unit as forward hydraulic cleaning, more preferably, using continuously cross flow of a mixture of liquid to be filtered and a gas on the outer surface of the filter unit resulting from aeration as forward hydraulic cleaning.

Preferably, the velocity in process a) ranges from 0.01 to 2 m/s, more preferably 0.01 to 0.5 m/s, and more preferably 0.04 to 0.2 m/s.

Preferably, when the ratio of the membrane filtering resistance to the initial membrane filtering resistance is smaller than 1.2, the membrane separation device operates in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 30 minutes and the ratio of inoperative time to the total time period ranging from 5 to 20%, and more preferably, the time period ranging from 5 to 15 minutes and the ratio of the inoperative time to the total time period ranging from 5 to 10%.

Preferably, when the ratio of the membrane filtering resistance to the initial membrane filtering resistance is larger than or equal to 1.2, the membrane separation device continues to operate in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 30 minutes and the ratio of inoperative time to the total time period ranging from 5 to 20%; and process b) is applied during the inoperative time of the membrane separation device in any one cycle of every 1 to 100 cycles, and more preferably, process b) is applied during the inoperative time of the membrane separation device in any one cycle of every 4 to 24 cycles, and the medium in process b) is membrane permeating liquid of the membrane separation device.

Preferably, when the ratio of the membrane filtering resistance to the initial membrane filtering resistance is larger than or equal to 2, the membrane separation device continues to operate in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 30 minutes and the ratio of inoperative time to the total time period ranging from 5 to 20%; process b) is applied during the inoperative time of the membrane separation device in any one cycle of every 1 to 100 cycle, and the medium in process b) is membrane permeating liquid of the membrane separation device; and chemical enhanced backwashing is performed during the inoperative time of the membrane separation device in any one cycle of every 100 to 10000 cycles, and more preferably, for any 5 to 30 consecutive cycles of every 100 to 10000 cycles, the membrane separation device halts for the 5 to 30 consecutive cycles, and process c) is applied to the membrane separation device.

Preferably, whether or not to perform process b) or c) is determined by monitoring dynamically a varying cycle of variation of transmembrane pressure or the membrane filtering resistance, and more preferably, whether or not to perform process b) or c) is determined by monitoring dynamically a varying cycle of variation of a rate at which the transmembrane pressure or the membrane filtering resistance increases.

Preferably, the flux in process b) is 1 to 5 times as much as a membrane flux when the filter unit is in normal operation, and the duration in process b) is less than or equal to 5 minutes, and more preferably, the flux in process b) is 2 to 3 times as much as the membrane flux when the filter unit is in normal operation, and the duration in process b) is less than or equal to 1.5 minutes.

Preferably, the ratio of a total volume of the cleaning solution permeating the filter unit in the direction opposite to the normal working filtering direction of the filter unit in process c) to a total filter area of the filter unit ranges from 1 to 20 L/m$^2$ and more preferably 1 to 2 L/m$^2$.

Preferably, in process c) the cleaning solution permeates the filter unit in the direction opposite to the normal working filtering direction of the filter unit in at least two batches, a settling interval between every two of the batches ranges from 30 to 120 minutes, and more preferably 30 to 90 minutes.

Preferably, two cleaning solutions, an acid dipping solution and an alkali dipping solution, are used for acid dipping and alkali dipping in processes c) and d), the acid dipping solution is any one of or a mixture of any two or more of: a citric acid solution, an oxalic acid solution, a hydrochloric acid solution and a sulfuric acid solution, and the alkali dipping solution is a sodium hypochlorite solution, a sodium hydroxide solution, or a mixture of a sodium hypochlorite solution and a sodium hydroxide solution.

Preferably, in processes c) and d), acid dipping and alkali dipping both are performed once, and acid dipping is performed first and alkali dipping is performed secondly.

Preferably, in process c), a pH value of the acid dipping solution ranges from 1 to 4, more preferably from 2 to 4; an effective chlorine concentration of the sodium hypochlorite solution ranges from 50 to 3000 mg/L, more preferably 200 to 1000 mg/L; and a pH value of the sodium hypochlorite solution or the mixture of the sodium hypochlorite solution and the sodium hydroxide solution ranges from 8 to 14, more preferably from 8 to 12.

Preferably, in process d), a pH value of the acid dipping solution ranges from 1 to 4, more preferably from 1 to 2; an effective chlorine concentration of the sodium hypochlorite solution ranges from 1000 to 6000 mg/L, more preferably 3000 to 5000 mg/L; and a pH value of the sodium hypochlorite solution or the mixture of the sodium hypochlorite solution and the sodium hydroxide solution ranges from 8 to 14, more preferably from 10 to 14.

Preferably, in process d), a duration of acid dipping ranges from 1 to 48 hours, more preferably 2 to 12 hours; and a duration of alkali dipping ranges from 1 to 48 hours, more preferably 12 to 24 hours.

An apparatus for cleaning a membrane separation device, includes:

the membrane separation device, an aeration device, a reverse cleaning device, an agent loading pump, an agent tank, a cleaning solution tank and associated channels and valves, a water inlet of the reverse cleaning device being connected with the cleaning solution tank via a channel, and a water absorbing inlet of the agent loading pump being connected with the agent tank via a channel, wherein:

a channel connected with a membrane permeating liquid outlet of the membrane separation device has two branches, a first branch is connected with a membrane permeating liquid tank for storing membrane permeating liquid of the membrane separation device, and a second branch is connected with a water outlet of the reverse cleaning device and/or a gas outlet of the aeration device, and a water outlet of the agent loading pump is connected with the second branch.

Preferably, a flux meter and a pressure meter for monitoring transient flux and pressure of the membrane permeating liquid are installed in a channel connected with the membrane permeating liquid outlet of the membrane separation device, more preferably, a flux meter and a pressure meter for online monitoring continuously transient flux and pressure of the membrane permeating liquid are installed in a channel connected with the membrane permeating liquid outlet of the membrane separation device.

Preferably, the membrane separation device has an enclosed housing, a feed-liquid inlet and a feed-liquid outlet; a gas distributor is arranged in the enclosed housing; and the gas distributor is connected with the gas outlet of the aeration device.

Preferably, the membrane separation device is arranged in a membrane filter tank; the membrane filter tank is a box or a small structure with a volume slightly larger than a volume of the membrane separation device itself; and a gas distributor is arranged in membrane filter tank and is connected with the gas outlet of the aeration device.

Preferably, the membrane separation device is used to separate biomass and water in a membrane bioreactor; the membrane separation device having an enclosed housing or a membrane filter tank containing the membrane separation device is arranged outside a bioreactor in the membrane bioreactor; and the membrane separation device or the membrane filter tank is connected with the bioreactor via a channel.

Preferably, the membrane separation device is used to separate floccules and water in a coagulation reactor; the membrane separation device having an enclosed housing or a membrane filter tank containing the membrane separation device is arranged outside the coagulation reactor; and the membrane separation device or the membrane filter tank is connected with the coagulation reactor via a channel.

Preferably, the reverse cleaning device is a pulsed reverse cleaning system including a pressure stabilizing tank and a water compensation pump.

Preferably, a gas distributor is arranged in the membrane separation device having an enclosed housing or a membrane filter tank containing the membrane separation device; and a channel connected with the water outlet of the reverse cleaning device has two branches, one of the two branches is connected with the second branch, and the other of the two branches is connected with a channel that connects the gas outlet of the aeration device and a gas inlet of the gas distributor.

Preferably, an outflow pump is added in the first branch; and the membrane permeating liquid outlet of the membrane separation device is connected with a water inlet of the outflow pump.

As compared with the prior art, the method for cleaning a membrane separation device according to the invention provides a cleaning method which combines four cleaning modes, i.e., forward hydraulic cleaning, reverse hydraulic cleaning, reverse chemical cleaning and forward chemical cleaning, with descending applying frequencies. Different types of membrane fouling can be thoroughly removed duly by the various modes, and cleaning modes that cost less and are easy to operate are used preferentially, thereby reducing the amounts of the cleaning solution and the chemical agent used, which maximizes the actual operating time of the membrane separation device, and shortening the standby or halt time of the water treatment plant due to the cleaning of the membrane separation device, which maximizes the actual utilization of the membrane separation device and reduces construction costs and operating costs of the system to a certain extent. By using the cleaning apparatus corresponding to the cleaning method of the invention, the membrane separation device does not need to be dismounted from the water treatment system; therefore all cleaning operations can be performed online, improving the convenience of cleaning of the membrane separation device, and reducing the labor.

Figure 1:
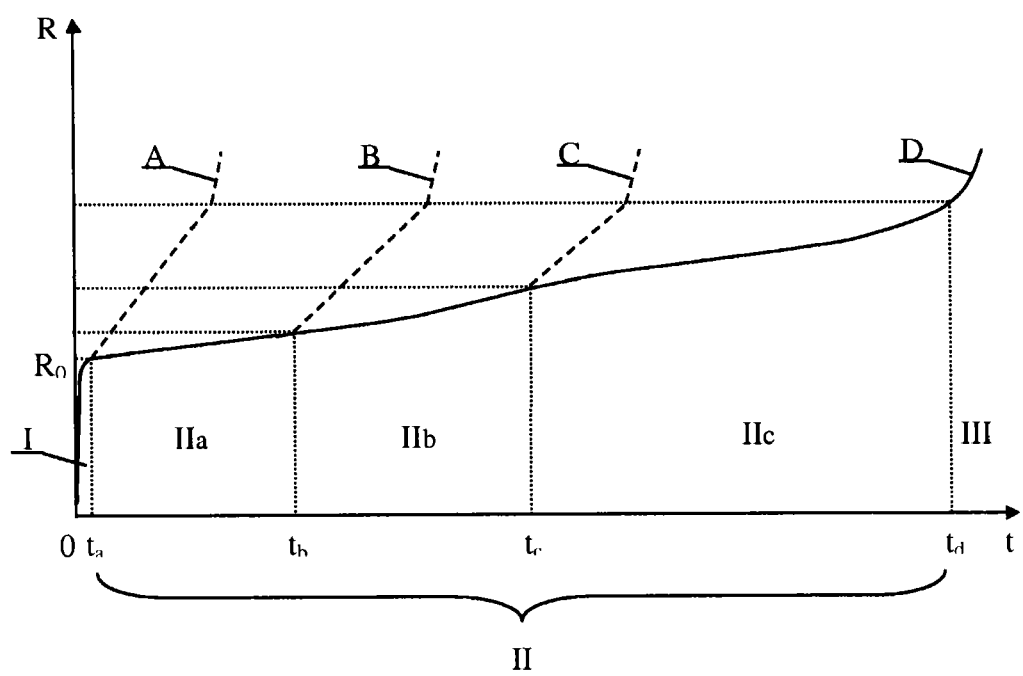
FIG. 1 is a diagram illustrating the variation of membrane filtering resistance over time.

Reference numerals in the drawings are as follows:
1—feed-liquid supplying valve; 2—feed-liquid backflow valve; 3—membrane filter tank gas supplying valve; 4—bioreaction tank gas supplying valve; 5—reverse cleaning valve; 6—produced water valve; 7—forward cleaning valve; 8—bioreaction tank; 9—membrane filter tank; 10—membrane permeating liquid tank, 11—feed-liquid supplying channel; 12—feed-liquid backflow channel; 13—feed-liquid inlet; 14—feed-liquid outlet; 15—circulation pump; 16—outflow pump; 17—reverse cleaning pump; 18—agent loading pump; 19—membrane separation device; 20—membrane permeating liquid outlet; 21—agent tank; 22—blower; 23—gas distributor in membrane filter tank; 24—gas distributor in bioreaction tank; 25—pressure transformer; 26—electromagnetic flux meter; 27—pressure stabilizing tank; 28—water compensation pump; 29—coagulation reaction tank; 30—inclined plate sedimentation tank; 31—intermediate water tank; 32—stirrer; 33—coagulant loader; 34—inclined plate.

DETAILED DESCRIPTION OF THE INVENTION

The technical solutions above and relating technical details are explained and described hereinafter.

A method for cleaning a membrane separation device includes the processes of:

a) performing forward hydraulic cleaning to have a gas, liquid or gas-liquid mixture wash an outer surface of a filter unit at a predetermined velocity, when the ratio of membrane filtering resistance to an initial membrane filtering resistance is smaller than 1.2;

b) performing reverse hydraulic cleaning to have a gas, liquid or gas-liquid mixture permeate the filter unit in a direction opposite to a normal working filtering direction of the filter unit at a predetermined flux and a predetermined duration, when the ratio of the membrane filtering resistance to the initial membrane filtering resistance is larger than or equal to 1.2;

c) performing reverse chemical cleaning to have a cleaning solution containing a chemical agent permeate the filter unit in the direction opposite to the normal working filtering direction of the filter unit at a predetermined flux and a predetermined duration, when the ratio of the membrane filtering resistance to the initial membrane filtering resistance is larger than or equal to 2; and d) performing forward chemical cleaning to have a cleaning solution containing a chemical agent soak the outer surface of the filter unit for a period of time, when the ratio of the membrane filtering resistance to the initial membrane filtering resistance is larger than or equal to 3.

It is noted that, the foregoing processes are not necessarily applied in the order as presented, although the ratio of the membrane filtering resistance to the initial membrane filtering resistance may gradually increase over time.

For descriptive convenience, the surface of the filter unit in the membrane separation device that is in contact with the liquid to be filtered while the filter unit is in its normal operation is referred to herein as an outer surface, and the surface that is opposite to the outer surface is referred to as an inner surface. The filtering resistance of the filter unit in the membrane separation device is referred to as membrane filtering resistance (denoted as R), and the membrane filtering resistance a short period of time after the membrane separation device is put into use when pore clogging and the gel layer on the outer surface have just formed and no cake layer has been formed is referred to as initial membrane filtering resistance (denoted as $R_0$). For more details regarding the initial membrane filtering resistance, please refer to paragraph [0051]. The rate at which the membrane filtering resistance varies over time is referred to as membrane filtering resistance increasing rate (denoted as dR/dT); the pressure difference between the outer surface and the inner surface of the filter unit is referred to as Transmembrane Pressure (TMP), and the volume of the membrane permeating liquid that flows through a unit area of the normal working outer surface of the membrane separation device per unit time is referred to as membrane flux (denoted as J).

In filter theories, the membrane filtering resistance may be calculated with:

$$R = TMP/(\mu \cdot J)$$

where:
R—membrane filtering resistance ($m^{-1}$);
TMP—transmembrane pressure (Pa);
$\mu$—viscosity of membrane permeating liquid (Pa·s); and
J—membrane flux ($m^3/(m^2 \cdot s)$).

Process a) and process b) both are hydrodynamic approaches, process c) combines a hydrodynamic approach and a chemical approach, and process d) is a chemical approach. According to membrane fouling removing effects of hydrodynamic approaches, membrane fouling can be classified as reversible fouling and irreversible fouling. Reversible fouling can be well controlled and removed by hydrodynamic approaches, and irreversible fouling can only be thoroughly removed by chemical approaches. Referring to the causes and the substance of membrane fouling discussed above, the inventors consider the cake layer substantially reversible, consider pore clogging mostly reversible with a certain degree of irreversibility, consider the gel layer mostly irreversible with a certain degree of reversibility, and consider mineral scaling substantially irreversible. As shown in FIG. 1, the variation of the membrane filtering resistance over time can be divided into three stages: I, II and III. Stage I begins several seconds or minutes after filtration starts, during which membrane filtering resistance R increases rapidly due to concentration polarization, pore clogging and gel layer formation (on the outer surface). This stage ends at time ta, and the membrane filtering resistance R at time ta is the initial membrane filtering resistance $R_0$. The initial membrane filtering resistance $R_0$ results mainly from irreversible fouling, hence can not be controlled by hydrodynamic approaches. Stage II may last for a relatively long period of time, during which particles are gradually deposited on the outer surface of the filter unit, to form the cake layer. In this stage, membrane filtering resistance R generally increases slowly and results mainly from reversible fouling, therefore can be effectively controlled by hydrodynamic approaches. Stage III begins after the gel layer and cake layer further thicken and solidify, and generally includes formation of a gel layer on the inner surface. In this stage, membrane filtering resistance R increases rapidly again and results mainly from irreversible fouling. Filtering performance of the membrane deteriorates greatly and can only be thoroughly recovered by chemical approaches.

Process d) can thoroughly remove various contaminations on the outer surface and the inner surface of the filter unit and inside the membrane pore, and substantially recover the filtering performance of the membrane separation device. However, the applying of process d) requires a large amount of the chemical agent and a long duration, during which the water treatment plant is put in a standby or halt state; in some cases, the membrane separation device has to be dismounted from the system using hoisting equipment. Therefore, the applying frequency of process d) should be held as low as possible. In fact, according to the different characteristics of membrane fouling exhibited in the different development stages, the duration of stage II may be extended as long as possible by appropriately applying processes a), b) and c), to postpone process d), thereby effectively controlling the membrane filtering resistance at a proper level, improving the actual utilization of the membrane, and reducing the amounts of the cleaning solution and the chemical agent used. From the perspective of further reducing cleaning costs, since processes b) and c) both lose some effective operating time of the membrane separation device and thus reduce its actual utilization, their applying frequencies should be held lower than process a). Moreover, since process c) additionally uses the chemical agent, hence costs more, its applying frequency should be held lower than process b).

Early in stage II, generally the membrane filtering resistance increases slowly, mainly due to the gradual formation of the cake layer. Hence, at this time, a good membrane fouling controlling effect can be expected simply by applying process a). This period of time is referred to as stage IIa. In stage IIa, the membrane filtering resistance shall increase rapidly as shown by curve A if process a) is not applied. As the operating time goes on to time tb at which stage IIa ends, the cake layer gradually thickens and solidifies, and membrane fouling exhibits mostly irreversibility. Then, the cleaning effect of process a) gradually degrades, and process b) can well remove pore clogging and part of the gel layer and cake layer. Particularly, reverse hydraulic cleaning can effectively prevent the cake layer from further thickening and solidifying. This period of time is referred to as stage IIb. In stage IIb, the membrane filtering resistance shall increase rapidly as shown by curve B if process b) is not applied. As the operating time further goes on to time tc at which stage IIb ends, the gel layer and cake layer on the outer surface both further thicken and solidify, and a gel layer may even also appear on the inner surface due to reproduction of microorganisms. Hence, the proportion of irreversible fouling to total membrane fouling increases gradually, and using solely the hydrodynamic processes a) and/or b) no longer can obtain a good cleaning effect. Besides its minor contribution to removal of mineral scaling on the outer surface, process c) can generally well remove the gel layer and pore clogging on the inner surface, and can prevent further thickening and solidifying of the gel layer and cake layer on the outer surface to a certain extent, although can not thoroughly remove the gel layer and cake layer on the outer surface. Moreover, the duration of process c) is relatively short, during which the water treatment plant is just put in a temporary standby state, and the membrane separation device does not need to be dismounted from the system. Therefore, process c) costs less than process b). This period of time is referred to as stage IIc. In stage IIc, the membrane filtering resistance shall increase rapidly as shown by curve C if process c) is not applied. After a long operating time of the membrane separation device, which goes on to time td at which stage IIc ends, the membrane filtering resistance increases greatly, and membrane fouling is mostly irreversible fouling. Then, the filtering performance of the membrane can only be thoroughly recovered by applying process d). As shown in FIG. 1, applying process a) in stage IIa, process b) in stage IIb and process c) in stage IIc can extend stage II sufficiently so that the membrane filtering resistance increases slowly as shown by curve D, and can significantly delay the occurrence of time td. It is noted that in fact curve D zigzags and oscillates at small amplitudes in stages IIb and IIc.

The membrane separation device may operate with a constant membrane flux (referred to as constant flux operation), or with a constant transmembrane pressure (referred to as constant TMP operation). Preferably, the membrane separation device operates with a constant membrane flux. Constant flux operation and constant TMP operation are two basic drive supplying forms in membrane separation. In constant flux operation mode, the membrane flux is maintained substantially constant, and the transmembrane pressure shall gradually increase as the membrane filtering resistance increases. In constant TMP operation mode, the transmembrane pressure is maintained substantially constant, and the membrane flux shall gradually reduce as the membrane filtering resistance in creases. Since actual water treatment applications generally require membrane separation devices to have stable water producing capability, constant flux operation is more applicable. Moreover, since the viscosity of the membrane permeating liquid is generally a function of temperature, if the temperature of the membrane permeating liquid is substantially constant, then the viscosity of the membrane permeating liquid is also substantially constant, therefore, in constant flux operation mode, the real-time variation trend of the transmembrane pressure substantially agrees with the real-time variation trend of the membrane filtering resistance, and the timing of applying the cleaning processes can be determined by comparing transmembrane pressures that are easily measurable.

The membrane separation device may operate in cross-flow filtration mode, or in dead-end filtration mode. Preferably, the membrane separation device operates in cross-flow filtration mode. Cross-flow filtration and dead-end filtration are two basic feed-liquid supplying forms in membrane separation. In cross-flow filtration, the liquid to be filtered or a mixture of a gas and a liquid to be filtered flows across the outer surface of the filter unit at a certain velocity. Two perpendicular motions exist on the outer surface of the filter unit, and the hydraulic shear force resulting from the cross flow of the liquid or the gas-liquid mixture can effectively control deposition of contaminations on the outer surface of the filter unit. Dead-end filtration includes solely the one-way motion of the membrane permeating liquid, but does not include the cross flow on the outer surface of the filter unit. In dead-end filtration, membrane fouling develops rapidly, hence dead-end filtration is adopted merely in some special cases, and cross-flow filtration is adopted in most membrane separation processes.

When the membrane separation device operates in cross-flow filtration mode, process a) can use the cross flow of a gas, liquid or gas-liquid mixture on the outer surface of the filter unit to control membrane fouling, especially the cake layer resulting from deposition of particles. Preferably, the cross flow of the liquid to be filtered or a mixture of the liquid to be filtered and a gas on the outer surface of the filter unit in cross-flow filtration mode may be used continuously as process a). When the membrane separation device is used to separate biomass and water in a membrane bioreactor, aeration can be performed continuously in the area where the membrane separation device is located, so that the cross flow of a mixture of the liquid to be filtered and a gas is formed on the outer surface of the filter unit. By using continuously the cross flow as process a), the bioreactor can be provided with oxygen gas and membrane fouling can be controlled; moreover, the cross flow of a gas-liquid mixture can offer a better membrane fouling controlling effect than a liquid alone. Studies and engineering practice have shown that, if cross flow exists all the time on the outer surface of the filter unit, and its velocity is kept higher than or equal to a critical value and the membrane flux is kept lower than or equal to a critical value, then process a) can effectively control the cake layer on the outer surface of the filter unit within a certain thickness range and can maintain the membrane filtering resistance at an appropriate level, so that stage IIa can last for a relatively long period of time. The critical value of the cross velocity is referred to herein as economical velocity, and the critical value of the membrane flux is referred to as critical flux.

A higher critical flux leads to a higher water producing capability of the membrane separation device, and less membrane separation devices used to meet a designated processing scale of water treatment, and hence reduced construction costs of the system. A lower economical velocity leads to reduced operating power consumption of a system with a designated processing scale of water treatment. However, numerous studies have shown that, generally the critical flux is positively correlated with the economical velocity; therefore, reducing the construction costs and reducing the operating power consumption contradict each other, and it is impossible to optimize both of them. In existing water treatment applications using membrane separation devices, especially those using membrane bioreactors, generally the membrane flux is kept within a so-called subcritical flux range, i.e., to approach the critical flux as closely as possible without exceeding the critical flux, which may improve the water producing capability of the membrane separation device as high as possible. However, the corresponding economic velocity is still not satisfactory. To further reduce the economic velocity, a common practice is to have the membrane separation device operate intermittently in cycles at a fixed time period, the time period being generally 5 to 30 minutes and the ratio of inoperative time to the total time period being generally 5% to 20%. As the force that attaches the particles to the outer surface disappears instantaneously when the filter unit halts, some of the particles deposited on the outer surface may return to the liquid-phase body. By appropriately reducing effective operating time of the membrane separation device, this method can reduce the economic velocity to a certain extent, and improve the corresponding critical flux. This intermittent operating method is adopted in almost all membrane separation devices in membrane bioreactors and membrane separation devices in numerous other situations. In fact, in stage IIb, process b) can use the short period of time during which the filter unit halts in the intermittent operating of the membrane separation device where it operates intermittently in cycles at a fixed time period, to apply a reverse pressure difference to the membrane separation device, so that the membrane permeating liquid can permeate the filter unit in a direction that is opposite to the filtering direction of the filter unit while it is in normal operation. Then, membrane fouling due to pore clogging can be well removed, and the gel layer and cake layer on the outer surface of the filter unit can be partially removed. The medium of backwashing used in process b) may be another water source that is more pure (e.g., tap water, desalted water), gas (e.g., air) or gas-liquid mixture. However, the membrane permeating liquid of the membrane separation device is preferred in process b), because using another water source that is more pure may increase operating costs of the system, and using a gas or gas-liquid mixture may cause the gas to accumulate in a membrane permeating liquid collection channel when the membrane separation device starts normal filtration after reverse hydraulic cleaning, which requires a complex vacuum device to remove the gas and further reduces the effective operating time of the membrane separation device.

Since some of the effective operating time of the membrane separation device is lost due to the intermittent operating method, the actual utilization and water producing capability of the membrane separation device are reduced. Process b) can well remove membrane fouling due to pore clogging without using extra effective operating time of the membrane separation device, but it costs extra membrane permeating liquid of the membrane separation device, thereby further degrading the actual water producing capability of the membrane separation device. Hence, process b) should not be applied frequently; otherwise the actual utilization and water producing capability of the membrane separation device will deteriorate greatly, which requires more membrane separation devices to meet a designated processing scale. Based on engineering practice and theoretical analysis, the inventors found an economic and feasible solution which uses jointly processes a) and b) in stage IIb, in which: the membrane separation device continues to operate in cross-flow filtration mode, and the cross flow of the liquid to be filtered or a mixture of the liquid to be filtered and a gas on the outer surface of the filter unit is used continuously as process a); meanwhile, the membrane separation device operates intermittently in cycles at a fixed time period, the time period being 5 to 30 minutes and the ratio of inoperative time to the total time period being 5% to 20%; and when the ratio of the membrane filtering resistance to the initial membrane filtering resistance is larger than or equal to 1.2, process b) is applied during the inoperative time of the membrane separation device in any one cycle of every 1 to 100 cycles, the medium used in process b) being the membrane permeating liquid of the membrane separation device, preferably, process b) is applied during the inoperative time of the membrane separation device in any one cycle of every 4 to 24 cycles, the medium used in process b) being the membrane permeating liquid of the membrane separation device.

Studies and practice have shown that, as the operating time of the membrane separation device goes on to the end of stage IIb, the gel layer on the outer surface of the filter unit gradually thickens, and a gel layer similar to that on the outer surface appears on the inner surface of the filter unit, which is mainly due to reproduction of microorganisms. This is more common in membrane bioreactors. Reverse hydraulic cleaning can make pore more permeable instantaneously, but it is difficult to remove the gel layers on the inner and outer surface; and as soon as normal filtration starts and reverse hydraulic cleaning stops, the pore will be rapidly covered again with viscous polysaccharide substances in the gel layer around the pore, thereby gradually degrading the effect of reverse hydraulic cleaning. Therefore, process c) should be applied to the membrane separation device after time tc at which stage IIb ends.

The duration of process c) may be relatively short or slightly longer. In the case where the duration is relatively short, a certain amount of a chemical agent may be added to part of the cleaning solution of process b), to form a high-frequency, short-duration and high-velocity version of Chemical Enhanced Backwashing (CEB), i.e., process c). CEB can be applied frequently in place of process b). However, it uses too much chemical agent, which is troublesome for storage; moreover, as a short-duration reverse chemical cleaning process, it does not have a good effect in removing the gel layer on the inner surface of the filter unit. Therefore, the inventors found an economic and feasible solution which uses jointly processes a), b) and c) in stage IIc, in which: the membrane separation device continues to operate in cross-flow filtration mode, and the cross flow of the liquid to be filtered or a mixture of the liquid to be filtered and a gas on the outer surface of the filter unit is used continuously as process a); meanwhile, the membrane separation device operates intermittently in cycles at a fixed time period, the time period being 5 to 30 minutes and the ratio of inoperative time to the total time period being 5% to 20%; and process b) is applied during the inoperative time of the membrane separation device in any one cycle of every 1 to 100 cycles, the medium used in process b) being the membrane permeating liquid of the membrane separation device, and CEB, i.e., process c), is applied during the inoperative time of the membrane separation device in any one cycle of every 100 to 10000 cycles.

Preferably, process c) is applied at a low frequency, a long duration and a low velocity, which not only saves the amount of the chemical agent used but also extends the time of the inner surface of the filter unit being soaked in the cleaning solution, thereby providing a better effect in removing the gel layer on the inner surface. Moreover, at a low velocity, the cleaning solution permeates slowly from the inside of the filter unit to its outside, and does not diffuse rapidly around the outer surface of the filter unit, hence may destroy the gel layer on the outer surface to a certain extent. Therefore, the inventors found a more preferred solution which uses jointly processes a), b) and c) in stage IIc, in which: the membrane separation device continues to operate in cross-flow filtration mode, and the cross flow of the liquid to be filtered or a mixture of the liquid to be filtered and a gas on the outer surface of the filter unit is used continuously as process a); meanwhile, the membrane separation device operates intermittently in cycles at a fixed time period, the time period being 5 to 30 minutes and the ratio of inoperative time to the total time period being 5% to 20%; and process b) is applied during the inoperative time of the membrane separation device in any one cycle of every 1 to 100 cycles, the medium used in process b) being the membrane permeating liquid of the membrane separation device; and for any 5 to 30 consecutive cycles of every 100 to 10000 cycles, the membrane separation device halts for the 5 to 30 consecutive cycles and process c) is applied to the membrane separation device. Therefore, the interval at which process c) is applied is approximately 2 to 90 days, which is acceptable for actual water treatment applications.

By using jointly processes a), b) and c) as described above, a good membrane fouling controlling and removing effect can be achieved, so that the membrane separation device can maintain a good filtering performance in a long term, and the interval at which process d) is applied can be extended greatly, to generally 6 to 24 months. None of processes a), b) and c) and no combinations of them can thoroughly remove the gel layer and mineral scaling on the outer surface of the filter unit. And as the operating time of the membrane separation device goes on, mineral scaling and the gel layer and cake layer may interact, which further solidifies and even hardens the gel layer and cake layer, hence, late removal requires a longer duration and a higher concentration of the chemical agent as compared with early removal. Therefore, the inventors found that the applying frequency of process d) is preferably once per 6 to 12 months.

To enhance the cleaning effect of process d), shorten its duration and reduce the amount of the chemical agent used, process a) and/or c) may be applied to the membrane separation device continuously or intermittently before, during or after process d) is applied to the membrane separation device, or in any two or more of the three periods of time above.

In process a), the velocity of the cross flow of the medium such as a gas, liquid or gas-liquid mixture on the outer surface of the filter unit ranges from 0.01 to 2 m/s, preferably 0.01 to 0.5 m/s, and more preferably 0.04 to 0.2 m/s.

In process b), the flux of the medium such as a gas, liquid or gas-liquid mixture permeates the filter unit in the direction that is opposite to the filtering direction of the filter unit while it is in normal operation is 1 to 5 times as much as the membrane flux of the filter unit while it is in normal operation, preferably 2 to 3 times, the duration being less than or equal to 3 minutes and preferably 1.5 minutes.

In process c), the ratio of the total volume of the cleaning solution permeating the filter unit in the direction opposite to the normal working filtering direction of the filter unit to the total filter area of the filter unit ranges from 1 to 20 $L/m^2$, preferably 1 to 2 $L/m^2$, the duration being 60 to 240 minutes and preferably 60 to 120 minutes. The cleaning solution may permeate the filter unit continuously with no interruption, or, in two or more batches with a certain period of time between every two batches for settling. Preferably, the cleaning solution permeates the filter unit in the direction opposite to the normal working filtering direction of the filter unit in at least two batches. The period of time for settling between every two batches ranges from 30 to 120 minutes, preferably 30 to 90 minutes.

In engineering practice, the intervals and durations in process b) or c) and the type and concentration of the chemical agent in process c) can be determined based on the particular environment where the membrane separation device operates. Process b) or c) may be applied at a fixed time period, or at a varying time period. If a flux meter (e.g., electromagnetic flux meter, vortex flux meter, or turbine flux meter) and a pressure meter (e.g., a pressure transducer) capable of online monitoring continuously transient flux and pressure of the membrane permeating liquid are installed in the membrane permeating liquid outlet channel of the membrane separation device in an actual application, the data can be collected in the real time by an automatic control system, to calculate transmembrane pressure and membrane filtering resistance. Based on real-time variation of the transmembrane pressure or the membrane filtering resistance detected, whether or not to apply process b) or c) to the membrane separation device and the corresponding duration, and the type and concentration of the chemical agent are determined. This determination may be made in two determination criteria: (1) with a set critical value of the increment of the transmembrane pressure or the membrane filtering resistance (i.e., $\Delta TMP$ or $\Delta R$), once the measured value of the increment of the transmembrane pressure or the membrane filtering resistance reaches the critical value, the automatic control system sends an instruction to an actuator to apply process b) or c); and (2) with a set critical value of the rate at which the transmembrane pressure or the membrane filtering resistance increases (i.e., $dTMP/dt$ or $dR/dt$), once the measured value of the rate at which the transmembrane pressure or the membrane filtering resistance increases reaches the critical value, the automatic control system sends an instruction to the actuator to apply process b) or c). Preferably, process b) or c) is applied based on monitoring dynamically a varying cycle of the variation of the transmembrane pressure or the membrane filtering resistance; and more preferably, process b) or c) is applied based on monitoring dynamically a varying cycle of the variation of the rate at which the transmembrane pressure or the membrane filtering resistance increases. In this manner, the amounts of the cleaning solution and the chemical agent used can be minimized.

The cleaning solution used in processes c) and d) can be one, two or more of: a sodium hypochlorite solution, a sodium hydroxide solution, a citric acid solution, an oxalic acid solution, a hydrochloric acid solution and a sulfuric acid solution. The sodium hypochlorite solution and the sodium hydroxide solution are alkali solutions, and may strongly oxidize, decompose, or dissolve organisms and microorganisms. The citric acid solution, the oxalic acid solution, the hydrochloric acid solution and the sulfuric acid solution are acidic solutions, and may well dissolve and remove mineral scaling. Therefore, in processes c) and d), preferably two cleaning solutions are used sequentially, one of which may be: a sodium hypochlorite solution, a sodium hydroxide solution or a mixture of a sodium hypochlorite solution and a sodium hydroxide solution (referred to hereinafter as an alkali solution, and the process cleaning the membrane separation device by using the alkali solution is referred to as alkali dipping), and the other of which may be any one of or a mixture of any two or more of: a citric acid solution, an oxalic acid solution, a hydrochloric acid solution and a sulfuric acid solution (referred to hereinafter as an acid solution, and the process cleaning the membrane separation device using the alkali solution is referred to as acid dipping). Alkali dipping and acid dipping may be performed sequentially with one preceding the other; or, may be performed repeatedly in various combination manners. Preferably, acid dipping and alkali dipping both are performed once, with acid dipping preceding alkali dipping. Be fore alkali dipping and after acid dipping, or, before acid dipping and after alkali dipping, the inside of the membrane separation device or the inside of the container containing the membrane separation device is cleaned by clean water, to prevent neutralization of acids and alkalis and generation of unwanted substances.

In process c), the effective chlorine concentration of the sodium hypochlorite solution used ranges from 50 to 3000 mg/L, preferably 200 to 1000 mg/L. In process d), the effective chlorine concentration of the sodium hypochlorite solution used ranges from 1000 to 6000 mg/L, preferably 3000 to 5000 mg/L. In processes c) and d), the pH value of the sodium hydroxide solution or the mixture of sodium hypochlorite and sodium hydroxide used is kept within the range of 8 to 14, preferably 8 to 12 for process c) and 10 to 14 for process d).

In processes c) and d), the pH value of any one of or a mixture of any two or more of: a citric acid solution, an oxalic acid solution, a hydrochloric acid solution and a sulfuric acid solution is kept within the range of 1 to 4, preferably 2 to 4 for process c) and 1 to 2 for process d).

In process d), alkali dipping is performed for 1 to 48 hours, preferably 12 to 24 hours; and acid dipping is performed for 1 to 48 hours, preferably 2 to 12 hours.

An apparatus for cleaning a membrane separation device includes a membrane separation device, an aeration device, a reverse cleaning device, an agent loading pump, an agent tank, a cleaning solution tank and associated channels and valves. A water inlet of the reverse cleaning device is connected with the cleaning solution tank via a channel, and a water absorbing inlet of the agent loading pump is connected with the agent tank via a channel. A channel connected with a membrane permeating liquid outlet of the membrane separation device has two branches, a first branch being connected with a membrane permeating liquid tank for the membrane permeating liquid of the membrane separation device, and a second branch being connected with a water outlet of the reverse cleaning device and/or a gas outlet of the aeration device. And a water outlet of the agent loading pump is connected with the second branch.

The reverse cleaning device may be a reverse cleaning pump, or a pulsed reverse cleaning system consisting of a pressure stabilizing tank and a water compensation pump. When the reverse cleaning device is a reverse cleaning pump, the water inlet of the reverse cleaning device is a water absorbing inlet of the reverse cleaning pump, and a water outlet of the reverse cleaning device is a water outlet of the reverse cleaning pump. When the reverse cleaning device is a pulsed reverse cleaning system consisting of a pressure stabilizing tank and a water compensation pump, the water inlet of the reverse cleaning device is a water absorbing inlet of the water compensation pump, and a water outlet of the reverse cleaning device is a water outlet of the pressure stabilizing tank. Preferably, the reverse cleaning device is a pulsed reverse cleaning system consisting of a pressure stabilizing tank and a water compensation pump.

The second branch may be connected with the water outlet of the reverse cleaning device; or, with the gas outlet of the aeration device; or, with both the water outlet of the reverse cleaning device and the gas outlet of the aeration device via a three-way valve. That is, the medium of reverse cleaning may be a liquid or a gas or include both gas and liquid. Preferably, the second branch is connected solely with the water outlet of the reverse cleaning device, so that the first branch is free from the trouble of removing accumulated gas due to the use of a gas or a gas-liquid mixture.

One or more filter units may be included in the membrane separation device. The filter unit refers to a component that has the function of filtering, which may be any of the various filter units available in the field of water treatment such as hollow fiber bundle type membrane module, hollow fiber curtain type membrane module, plate and frame flat membrane module, capillary membrane module, tube membrane module, and microporous filter pipe.

The membrane separation device may have an enclosed housing, or have no enclosed housing. When the membrane separation device has an enclosed housing, the housing has a feed-liquid inlet and a feed-liquid outlet for transmitting the liquid to be filtered, and a gas distributor is arranged inside the housing and is connected with the gas outlet of the aeration device. When the membrane separation device has no enclosed housing, the surface of the filter unit that is in contact with the liquid to be filtered is exposed, the membrane separation device may be placed inside a box with a volume slightly larger than that of the membrane separation device itself, or inside a small structure, e.g., the so-called membrane filter tank, so that process d) can be applied conveniently to the membrane separation device directly in the membrane filter tank, and a gas distributor is arranged inside the membrane filter tank and is connected with the gas outlet of the aeration device.

When the membrane separation device is used to separate biomass and water in a membrane bioreactor, the membrane separation device having an enclosed housing or the membrane filter tank containing the membrane separation device is arranged outside a bioreactor in the membrane bioreactor, and the membrane separation device or the membrane filter tank is connected with the bioreactor via a channel.

When the membrane separation device is used to separate floccules and water in a coagulation reactor, the membrane separation device having an enclosed housing or the membrane filter tank containing the membrane separation device is arranged outside the coagulation reactor, and the membrane separation device or the membrane filter tank is connected with the coagulation reactor via a channel.

When a gas distributor is arranged inside the membrane separation device having an enclosed housing or the membrane filter tank, a channel connected with the water outlet of the reverse cleaning device may have two branches, one being connected with the second branch, and the other being connected with the channel that connects the gas outlet of the aeration device and a gas inlet of the gas distributor. The branches both are provided with a valve. Hence, reverse cleaning can be performed on the membrane separation device using reverse cleaning water, and the gas distributor can be cleaned thereby prevent a gas distribution pore of the gas distributor from being clogged after a long period of time.

The membrane separation device may use the liquid level difference between a liquid level in the membrane separation device or the membrane filter tank and the membrane permeating liquid outlet of the membrane separation device, to realize automatic water outputting; or, use a negative pressure provided by an outflow pump connected with the membrane permeating liquid outlet of the membrane separation device, to pump out water. That is, the first branch may be provided with an outflow pump, or with no outflow pump. Preferably, an outflow pump is arranged in the first branch. Then, if a liquid level in the membrane permeating liquid tank for the membrane permeating liquid of the membrane separation device is higher than a liquid level in the membrane separation device or the membrane filter tank, or lower than the latter by a difference that is not enough for the membrane permeating liquid to be outputted automatically, the outflow pump can stabilize the water producing flux of the membrane separation device. More preferably, the channel that connects the membrane permeating liquid outlet of the membrane separation device and the membrane permeating liquid tank has two branches, one of which is connected with a water inlet of the outflow pump, a water outlet of the outflow pump being connected with the membrane permeating liquid tank via a channel, and the other of which is connected directly with the membrane permeating liquid tank. Therefore, the two branches are in parallel, and can replace each other as controlled by a valve.

The cleaning liquid tank may be the same container or structure as the membrane permeating liquid tank, or a container or structure different from the membrane permeating liquid tank. Preferably, the cleaning liquid tank is the same container or structure as the membrane permeating liquid tank. That is, the cleaning solution fed to the reverse cleaning device is the membrane permeating liquid of the membrane separation device, which makes the cleaning apparatus simpler.

The outlet of the agent loading pump may be connected to a channel between the water inlet of the reverse cleaning device and the cleaning solution tank via a channel, or be connected to a channel between the water outlet of the reverse cleaning device in the second branch and the membrane permeating liquid outlet of the membrane separation device via a channel. The number of the sets of agent loading pumps and agent tanks may be one, two or more, with each set placing a different chemical agent.

The technical solutions of the invention will be further described below in conjunction with the drawings and embodiments.

First Embodiment

Figure 2:
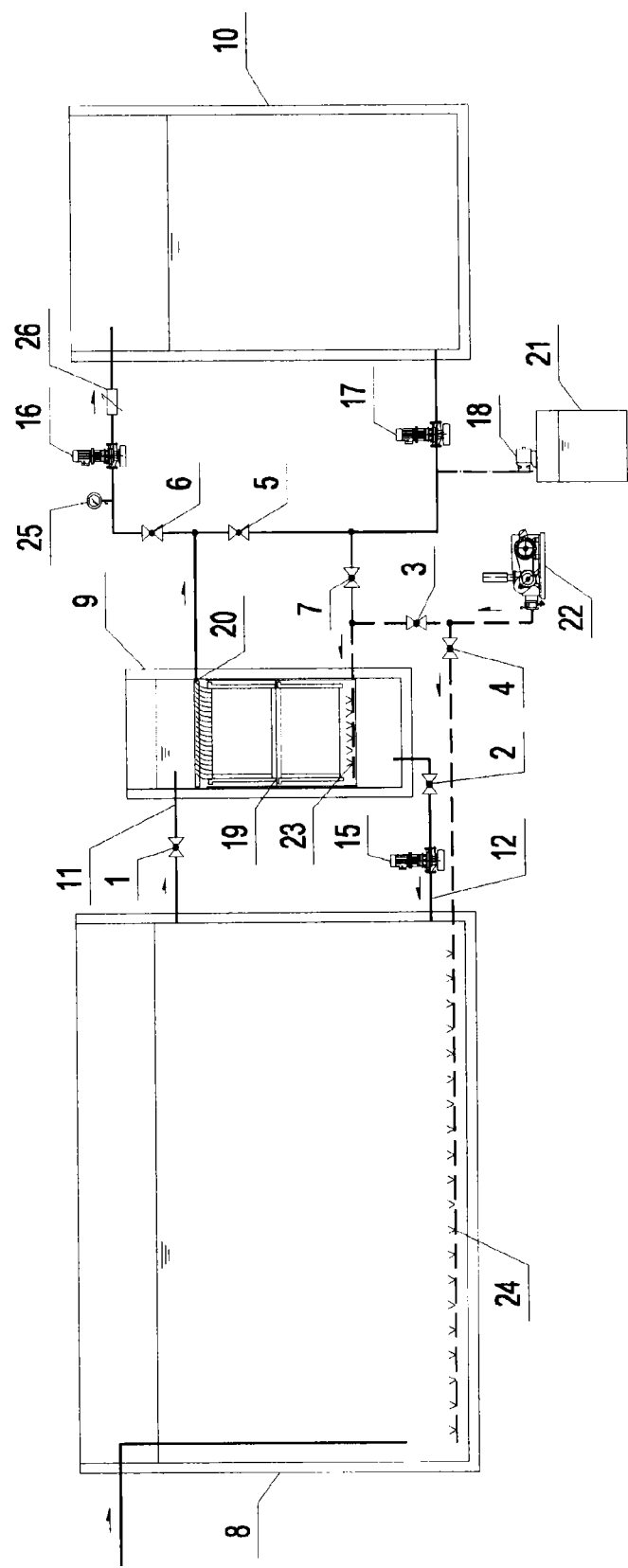
FIG. 2 is a structural diagram of an apparatus for cleaning a membrane separation device according to a first embodiment of the invention.
Figure 4:
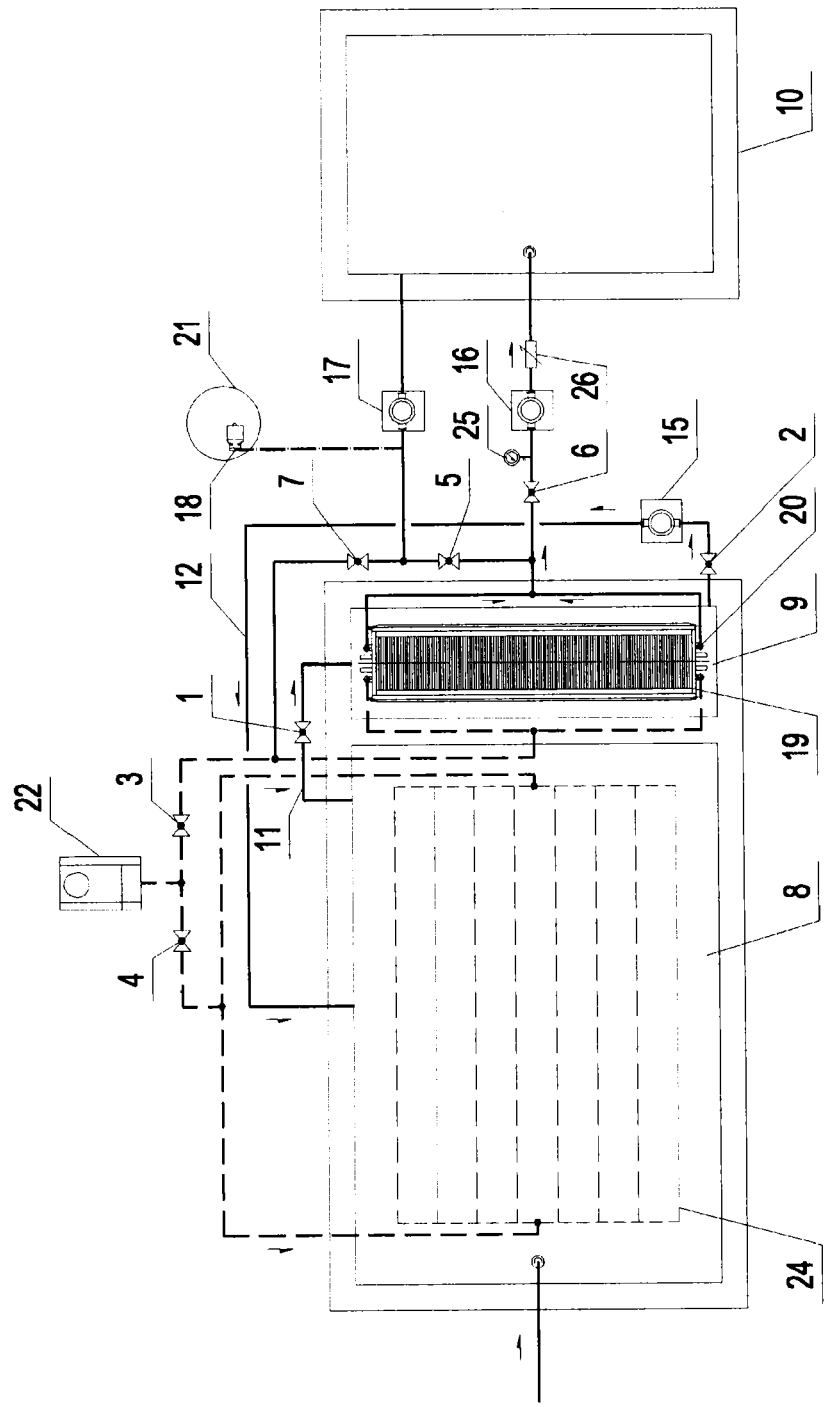
FIG. 4 is a plan view of the apparatus for cleaning a membrane separation device according to the first embodiment of the invention.

As shown in FIG. 2 and FIG. 4, as part of a membrane bioreactor based wastewater treatment system, an apparatus for cleaning a membrane separation device includes a bioreaction tank 8; a membrane filter tank 9 independent from the bioreaction tank 8 and having a wall shared with the bioreaction tank 8; a membrane separation device 19 arranged in the membrane filter tank 9; a membrane permeating liquid tank 10 for storing membrane permeating liquid of the membrane separation device 19; a feed-liquid supplying channel 11 for transmitting activated sludge mixed liquor in the bioreaction tank 8 to the membrane filter tank 9, and a feed-liquid supplying valve 1 installed in the feed-liquid supplying channel 11, where the feed-liquid supplying channel 11 passes through the sidewall of the bioreaction tank 8 at an upper part of the sidewall with the top of the channel being 400 mm lower than the liquid level inside, and passes through the sidewall of the membrane filter tank 9 at an upper part of the sidewall with the top of the channel being 200 mm lower than the liquid level inside and being above the membrane separation device 19; a feed-liquid backflow channel 12 for returning the concentrate in the membrane filter tank 9 to the bioreaction tank 8; a circulation pump 15 arranged in the feed-liquid backflow channel 12, where a channel connected with a water absorbing inlet of the circulation pump 15 is directed to the bottom of the membrane filter tank 9 and is located below the membrane separation device 19, and a feed-liquid backflow valve 2 is installed in the channel connected with the water absorbing inlet of the circulation pump 15; an outflow pump 16 for providing a negative pressure for the membrane separation device 19, which has a water absorbing inlet connected with a membrane permeating liquid outlet 20 of the membrane separation device 19 via a channel provided with a produced water valve 6, and has a water outlet connected with the membrane permeating liquid tank 10 via a channel provided with a pressure transducer 25 and an electromagnetic flux meter 26; a blower 22, as a gas source, where a channel connected with a gas outlet of the blower 22 has two branches, one of which is connected with a gas distributor 23 installed in the membrane filter tank 9 and is provided with a membrane filter tank gas supplying valve 3, and the other of which is connected with a gas distributor 24 installed in the bioreaction tank 8 and is provided with a bioreaction tank gas supplying valve 4; a reverse cleaning pump 17, where a water absorbing inlet of the reverse cleaning pump 17 is connected with the membrane permeating liquid tank 10 via a channel, and a channel connected with a water outlet of the reverse cleaning pump 17 has two branches, one of which is connected with the channel that connects the membrane permeating liquid outlet 20 and the water absorbing inlet of the outflow pump 16 and is provided with a reverse cleaning valve 5, and the other of which is connected with the channel that connects the blower 22 and the gas distributor 23 in the membrane filter tank 9 and is provided with a forward cleaning valve 7; and an agent loading pump 18 arranged right above an agent tank 21 cylindrically shaped and arranged next to the membrane permeating liquid tank 10, where a channel connected with an outlet of the agent loading pump 18 is connected to a channel at the water outlet of the reverse cleaning pump 17, at a site on a main channel before the reverse cleaning valve 5 and the forward cleaning valve 7.

The number of the membrane separation devices 19 is sixteen, which consist of hollow fiber curtain type membrane modules and are arranged in two rows with eight in each row. Each membrane separation device 19 is sized 600 m (length)× 600 mm (width)×1800 mm (height), and is integrated with ten hollow fiber curtain type membrane modules. Each hollow fiber curtain type membrane module consists of 398 hollow fibers made of polyvinylidene fluoride, with an outer diameter of 2.8 mm and an average membrane pore of 0.4 μm. The upper ends of the fibers can swing freely, each of which is in the closed state and is sealed using a flexible epoxy resin. The lower ends of the fibers are collected and cast in an end part using epoxy resin, and are secondarily cast using polyurethane so as to protect the root portions of fibers. The end parts are enclosed by produced water channels with an outer diameter of Φ8 mm. All produced water channels are connected in parallel to a main water collection channel.

The net inner size of the bioreaction tank 8 is 5 m (width)× 6.5 m (length)×3.5 m (depth), with an effective depth of water of 3 m and an effective volume of 97.5 m³. The net inner size of the membrane filter tank 9 is 5 m (width)×1.5 m (length)× 3.5 m (depth), with an effective depth of water of 2.8 m and an effective volume of 21 m³. The net inner size of the produced water tank 10 is 5 m (width)×3 m (length)×3.5 m (depth), with an effective depth of water of 3 m and an effective volume of 45 m³.

The circulation pump 15 has a flux of 120 m³/h (cubic meter per hour), a lift of 11 m and a power of 5.5 kw, the outflow pump 16 has a flux of 25 m³/h, a lift of 10 m and a power of 1.1 kw, the cleaning pump 17 has a flux of 80 m³/h, a lift of 15 m and a power of 5.5 kw, the agent loading pump 18 has a flux of 1.5 m³/h, a lift of 8 m and a power of 90 kw, the blower 22 has a wind flux of 3.86 m³/min (cubic meter per minute), a wind pressure of 39.2 kPa (kilopascal) and a power of 5.5 kW, and the agent tank 21 is sized Φ1000 mm×1500 mm and has an effective volume of 1000 L.

The feed-liquid supplying channel 11 and the feed-liquid backflow channel 12 both have an inner diameter of 200 mm. And the feed-liquid valve 1, the feed-liquid backflow valve 2, the membrane filter tank gas supplying valve 3, the bioreaction tank gas supplying valve 4, the reverse cleaning valve 5, the produced water valve 6 and the forward cleaning valve 7 are all electrical valves.

If the raw water is common domestic wastewater, its main indexes include: pH=6~9, $COD_{Cr}$=400~500 mg/L, $BOD_5$=200~300 mg/L, SS=100~300 mg/L, ammonia nitrogen=20~60 mg/L and TN=20~80 mg/L. For this kind of raw water, the wastewater treatment system according to the present embodiment has a processing capability of 20.8 m³/h and a daily processing scale of 500 m³/d (cubic meter per day); the bioreaction tank 8 has a hydraulic retention time of approximately 4.7 hours, an MLSS (sludge concentration) of 5~8 g/L, a volume load of 1.0~1.5 kg-$BOD_5$/(m³·d) and a sludge load of 0.13~0.21 kg-$BOD_5$/(kg-MLSS·d); the membrane filter tank 9 has a hydraulic retention time of approximately 1 hour; the bioreaction tank 8 and the membrane filter tank 9 have a total hydraulic retention time of approximately 5.7 hours; and the produced water tank 10 has a hydraulic retention time of approximately 2.2 hours.

Figure 6:
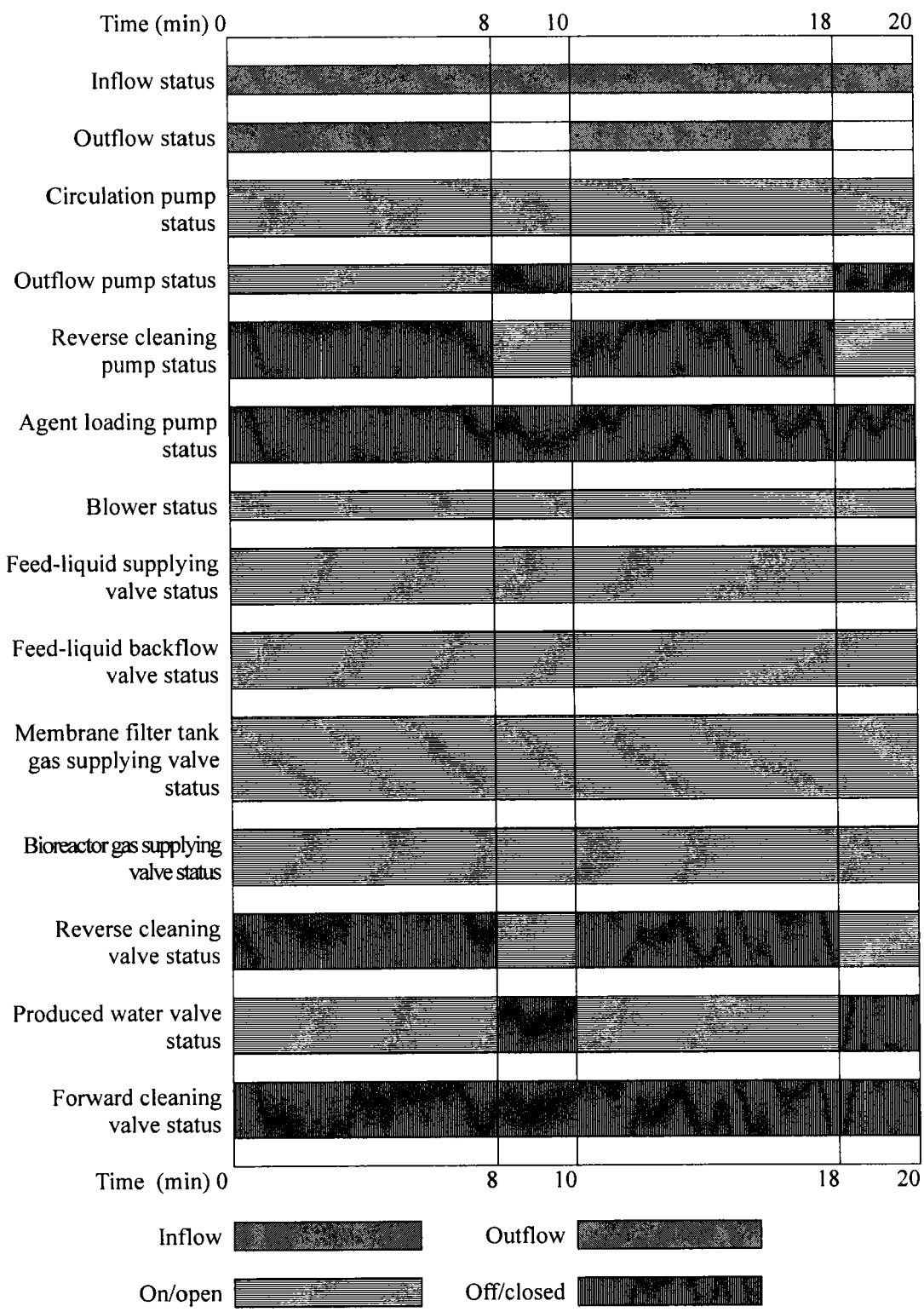
FIG. 6 is a diagram illustrating a forward hydraulic cleaning process and a reverse hydraulic cleaning process according to the first and second embodiments of the invention.

FIG. 6 illustrates a processing process of the whole wastewater treatment system when the membrane separation device 19 is in normal operation; and in fact process (a) is applied the whole time in this processing process. The feed-liquid supplying valve 1, the feed-liquid backflow valve 2, the membrane filter tank gas supplying valve 3 and a bioreaction tank gas supplying valve 4 remain open the whole time; the reverse cleaning valve 5 and the forward cleaning valve 7 remain closed the whole time; the circulation pump 15 operates continuously; the outflow pump 16 and the produced water valve 6 operate intermittently; and the reverse cleaning pump 17 and the agent loading pump 18 halt. Wastewater firstly enters the bottom of the bioreaction tank 8, and comes into full contact with activated sludge mixed liquor under the turbulence provided by the gas distributor 24. Aerobic heterotrophic bacteria biodegrade the organic substrates, and nitrobacteria convert ammonia nitrogen in the wastewater into nitrate nitrogen. Afterwards, the activated sludge mixed liquor in the bioreaction tank 8 enters the membrane filter tank 9 from its upper part via the feed-liquid supplying channel 11. In the membrane filter tank 9, solid-liquid separation of the activated sludge mixed liquor can be fully achieved due to the highly efficient separation function of the membrane separation device 19. The membrane permeating liquid of the membrane separation device 19 confluxes gradually to the membrane permeating liquid outlet 20, and is further transmitted to the membrane permeating liquid tank 10 by the outflow pump 16. Controlled by an automatic control system, the outflow pump 16 operates intermittently in cycles with a time period of 10 minutes; and in each cycle, the outflow pump 16 starts up and operates for 8 minutes, and halts for 2 minutes. Accordingly, the membrane separation device 19 filters normally for 8 minutes and stops filtering for 2 minutes, hence the ratio of its halt time to the total time period is 20%. Compressed air provided by the blower 22 is diffused via the gas distributor 23 in the membrane filter tank 9, which causes ascending of the gas-water two-phase flow in the membrane filter tank 9, and further leads to cross flow of the gas-water mixture on the outer surface of the hollow fiber membrane in the membrane separation device 19. This is used continuously as process (a), i.e., forward hydraulic cleaning, to effectively control the development of cake layer membrane fouling at a proper level. The concentrate in the membrane filter tank 9 finally is pressurized by the circulation pump 15 via the feed-liquid backflow channel 12, and returned to the bottom of the bioreaction tank 8, where it mixes again with the active sludge mixed liquor in the bioreaction tank 8 under the turbulence provided by the gas distributor 24 in the bioreaction tank.

FIG. 6 illustrates the processing of process (b), i.e., reverse hydraulic cleaning. Firstly, the produced water valve 6 is closed, the feed-liquid supplying valve 1, the feed-liquid backflow valve 2, the membrane filter tank gas supplying valve 3 and the bioreaction tank gas supplying valve 4 remain open, and the forward cleaning valve 7 remains closed; the outflow pump 16 halts, the circulation pump 15 remains its normal operation, and the agent loading pump 18 remains halted; the reversing cleaning valve 5 is opened, the reverse cleaning pump 17 is started up to inject the membrane permeating liquid of the membrane separation device 19 stored in the membrane permeating liquid tank 10 to the membrane permeating liquid outlet 20 at a flux twice as much as the flux of the membrane permeating liquid of the membrane separation device 19 while it is in normal operation, which finally passes through the hollow fiber membrane modules in a direction that is opposite to the water permeating direction of the membrane modules while they are in normal operation at a duration of 1.5 minute; afterwards, the reverse cleaning pump 17 halts, the reversing cleaning valve 5 is closed, the produced water valve 6 is opened immediately, the outflow pump 16 is started up, and the wastewater treatment system is back to the normal operation state as shown in FIG. 6. Switching the associated valves before and after the reverse cleaning pump 17 is started up uses 0.5 minutes, that is, the total duration of reverse hydraulic cleaning is 2 minutes. Reverse hydraulic cleaning may be performed at a constant time period under the control of the automatic control system. The pressure transducer 25 and the electromagnetic flux meter 26 monitor in the real time a pressure and an instantaneous flux of the membrane permeating liquid of the membrane separation device 19, and the automatic control system collects data in the real time and calculates the transmembrane pressure TMP and the membrane filtering resistance R of the membrane separation device 19. Once the measured value of R reaches a determined critical value, the automatic control system sends an instruction to an actuator, to initiate a reverse hydraulic cleaning process. Reverse hydraulic cleaning may be performed once during the sixth cycle of the membrane separation device 19 after every five cycles, i.e., performed once per hour with a duration of 2 mines. This coincides completely with the time slot during which the membrane separation device 19 stops its normal filtering.

Figure 7:
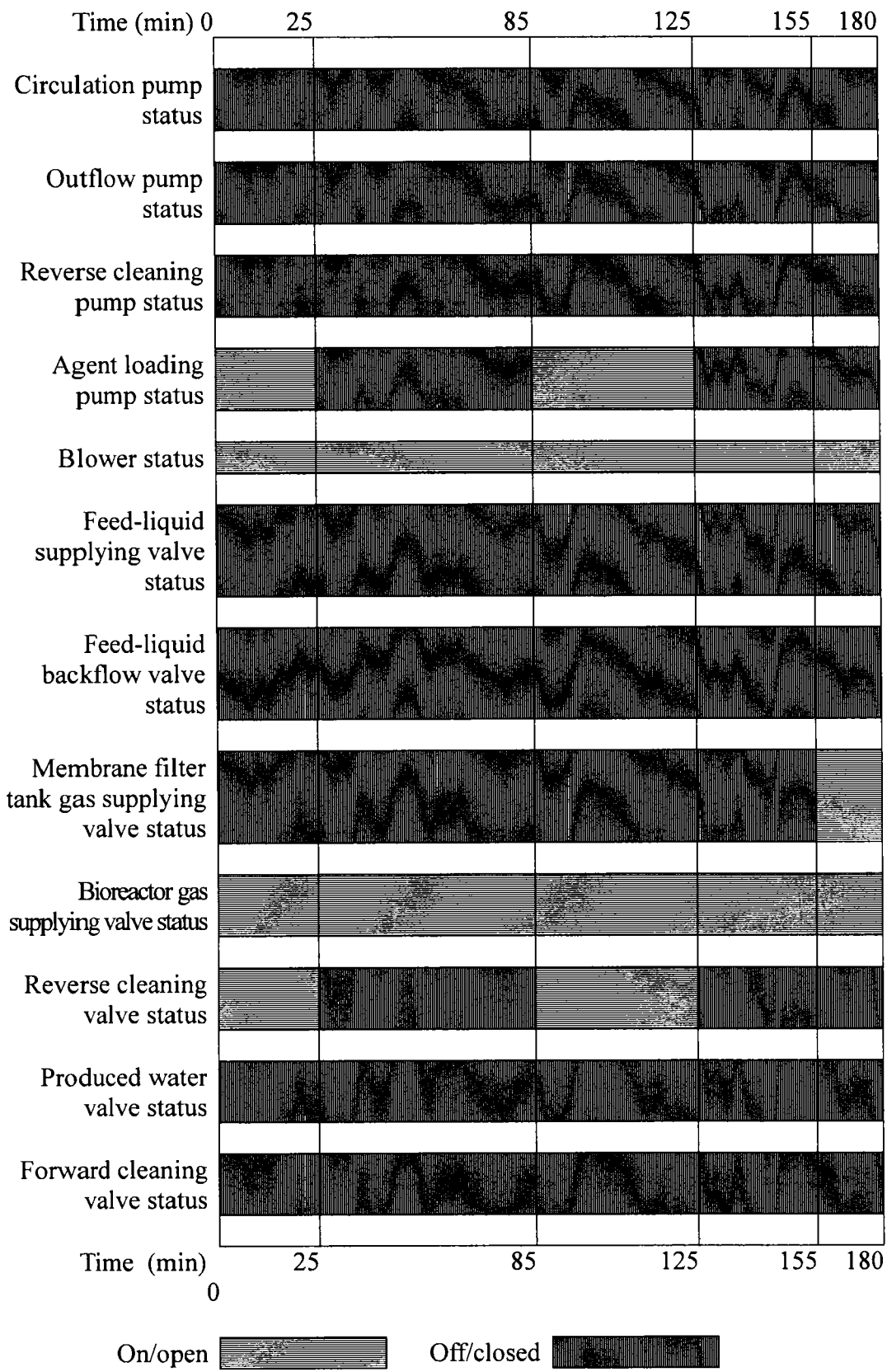
FIG. 7 is a diagram illustrating a reverse chemical cleaning process according to the first and second embodiments of the invention.

FIG. 7 illustrates the processing of process (c), i.e., reverse chemical cleaning. Firstly, the feed-liquid supplying valve 1, the feed-liquid backflow valve 2, the membrane filter tank gas supplying valve 3 and the produced water valve 6 are closed, the bioreaction tank gas supplying valve 4 remains open, the forward cleaning valve 7 remains closed; the circulation pump 15 and the outflow pump 16 halt, the reverse cleaning pump 17 remains halted; the reverse cleaning valve 5 is opened, to start up the agent loading pump 18; the agent loading pump 18 injects the cleaning solution stored in the agent tank 21 in two batches to the second branch (i.e., the channel that connects the water outlet of the reverse cleaning pump 17 and the membrane permeating liquid outlet 20). The cleaning solution is a sodium hypochlorite solution with an effective concentration of 1000 mg/L. The first batch of cleaning solution is injected at a volume of 500 L and a duration of 25 minutes. The cleaning solution enters inner cavities of the hollow fiber membrane modules via the membrane permeating liquid outlet 20. Part of the cleaning solution passes through the hollow fiber membrane modules in the direction opposite to the water permeating direction of the membrane modules while they are in normal operation, and most of the cleaning solution is stored in the inner cavities of the hollow fiber membrane modules to soak their inner surfaces. After 60 minutes of settling, the agent loading pump 18 injects 1000 L of the cleaning solution to the second branch at a duration of approximately 40 minutes. Then, after 30 minutes of settling, finally the membrane filter tank gas supplying valve 3 is opened to perform aeration on the membrane filter tank 9 at a duration of 25 minutes. Thus, reverse chemical cleaning completes, with a total duration of 180 minutes and 18 cycles. Afterwards, the agent loading pump 18 halts, the reverse cleaning valve 15 is closed, the feed-liquid supplying valve 1, the feed-liquid backflow valve 2 and the produced water valve 6 are opened immediately, and the circulation pump 15 and the outflow pump 16 are started up, and the wastewater treatment system is back to the normal operation state as shown in FIG. 6. Reverse chemical cleaning may be performed at a varying time period under the control of the automatic control system. The pressure transducer 25 and the electromagnetic flux meter 26 monitor in the real time a pressure and an transient flux of the membrane permeating liquid of the membrane separation device 19, and the automatic control system collects data in the real time and calculates the transmembrane pressure TMP, the membrane filtering resistance R and the rate at which the membrane filtering resistance increases dR/dt. Once the measured value of dR/dt reaches a determined critical value, the automatic control system sends an instruction to an actuator, to initiate a reverse chemical cleaning process.

Figure 8:
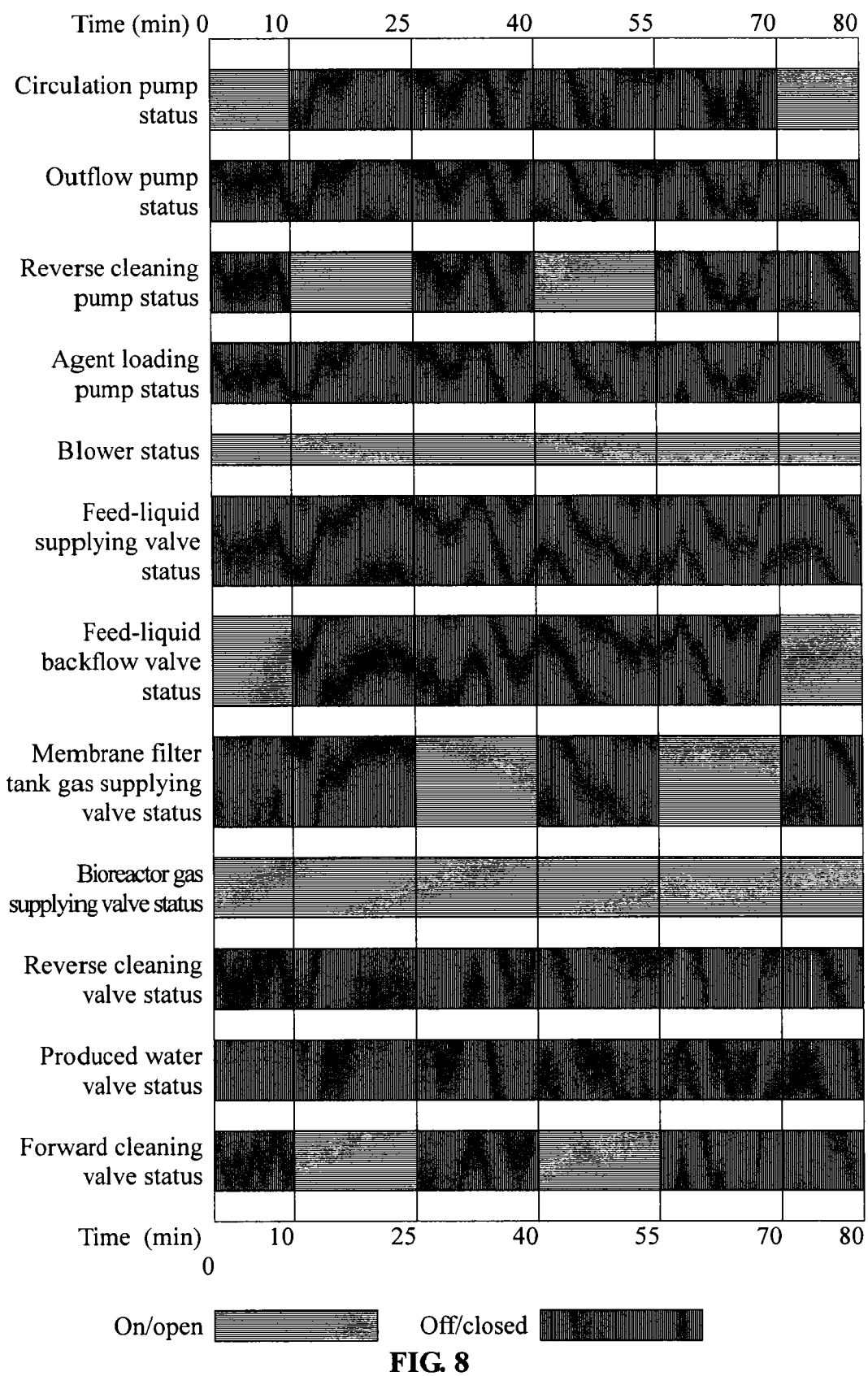
FIG. 8 is a diagram illustrating an early stage of the forward chemical cleaning process according to the first and second embodiments of the invention.
Figure 9:
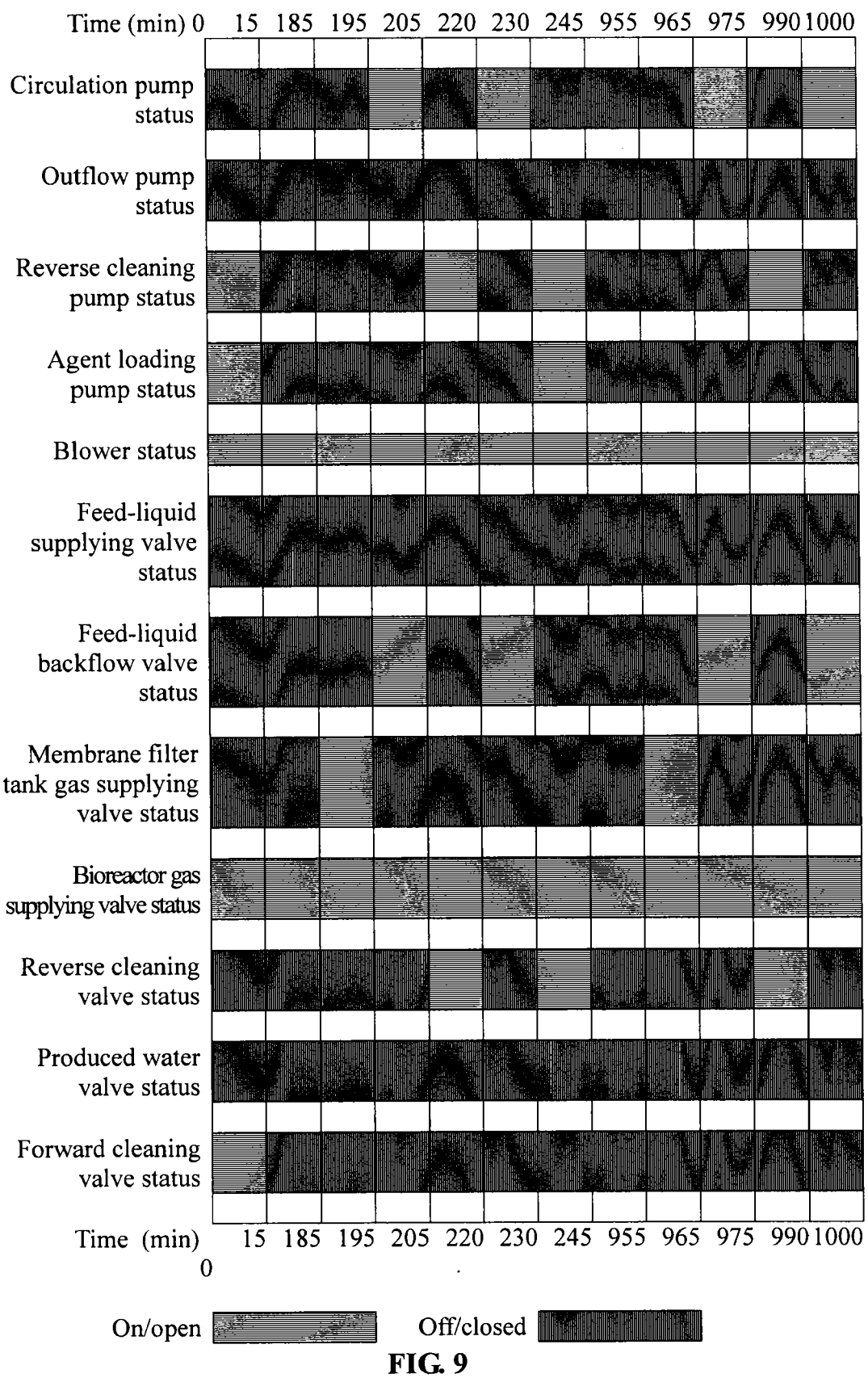
FIG. 9 is a diagram illustrating a later stage of the forward chemical cleaning process according to the first and second embodiments of the invention.

FIG. 8 and FIG. 9 illustrate the processing of process (d), i.e., forward chemical cleaning. Particularly, FIG. 8 illustrates an early stage of forward chemical cleaning, which mainly includes transmitting the mixed liquor in the membrane filter tank 9 to the bioreaction tank 8, and removing sludge in the air distributor 23 in the membrane filter tank 9 as well as possible sludge inside hollow fibers of any membrane module, between different hollow fiber membrane modules, on an inner wall of the membrane separation device 19 or at a corner of the membrane separation device 19. FIG. 9 illustrates a later stage of forward chemical cleaning, which mainly includes soaking the outer and inner surfaces of the hollow fiber membrane modules with the membrane permeating liquid containing a chemical agent with a certain concentration. In the early stage (see FIG. 8), firstly the feed-liquid supplying valve 1, the membrane filter tank gas supplying valve 3 and the produced water valve 6 are closed, the feed-liquid backflow valve 2 and the bioreaction tank gas supplying valve 4 remain open, the reverse cleaning valve 5 and the forward cleaning valve 7 remain closed; the outflow pump 16 halts, the reverse cleaning pump 17 and the agent loading pump 18 remain halted, and the circulation pump 15 continues its operation to transmit all mixed liquor in the membrane filter tank 9 to the bioreaction tank 8 via the feed-liquid backflow channel 12. Then, the circulation pump 15 halts, the forward reverse valve 7 is opened, and the reverse cleaning pump 17 is started up to inject the membrane permeating liquid stored in the membrane permeating liquid tank 10 to the gas distributor 23 in the membrane filter tank, which is finally diffused through gas distribution pores of the gas distributor 23. The reverse cleaning pump 17 halts after operating for 15 minutes, the forward cleaning valve 7 is closed, the membrane filter tank gas supplying valve 3 is opened, and compressed air provided by the blower 22 is diffused through the gas distribution pores of the gas distributor 23 at a duration of 15 minutes; this switching procedure is performed twice. Afterwards, the reverse cleaning pump 17 halts, the membrane filter tank gas supplying valve 3 and the forward cleaning valve 7 are closed, the feed-liquid backflow valve 2 is opened, and the circulation pump 15 is started up to transmit the mixed liquor in the membrane filter tank 9 to the bioreaction tank 8 via the feed-liquid backflow channel 12. Then, the later stage (see FIG. 9) is entered, the feed-liquid supplying valve 1, the membrane filter tank gas supplying valve 3 and the produced water valve 6 remain closed, and after the circulation pump 15 transmitting all the mixed liquor in the membrane filter tank 9 to the bioreaction tank 8, the circulation pump 15 halts, the feed-liquid backflow valve 2 is closed, and the agent loading pump 18 is started up to inject the chemical agent stored in the agent tank 21 to the second branch (i.e., the channel that connects the water outlet of the reverse cleaning pump 17 and the membrane permeating liquid outlet 20), and the membrane permeating liquid containing the chemical agent may be stored in the membrane filter tank 9 by any one of the following two approaches: i) the reverse cleaning valve 5 is opened, the forward cleaning valve 7 remains closed, and the reverse cleaning pump 17 and the agent loading pump 18 are started up synchronously, and the reverse cleaning pump 17 injects the membrane permeating liquid containing the chemical agent (the chemical agent and the membrane permeating liquid of the membrane separation device are mixed in the channel) to the membrane permeating liquid outlet 20, which finally passes through the hollow fiber membrane modules in the direction opposite to the water permeating direction of the membrane modules while they are in normal operation and is stored in the membrane filter tank 9; and ii) the forward cleaning valve 7 is opened, the reverse cleaning valve 5 remains closed, the reverse cleaning pump 17 and the agent loading pump 18 are started up synchronously, and the reverse cleaning pump 17 injects the membrane permeating liquid containing the chemical agent to the gas distributor 23, which finally is diffused through the gas distribution pores of the gas distributor 23 and stored in the membrane filter tank 9. After all membrane separation device 19 is fully soaked with the membrane permeating liquid containing the chemical agent, the agent loading pump 18 and the reverse cleaning pump 17 halt, and all valves in the channels connected with the interfaces of the membrane filter tank 9 are closed, so that the outer and inner surfaces of all the hollow fiber membrane modules are soaked with the membrane permeating liquid containing the chemical agent for a certain period of time. In the present embodiment, acid dipping is performed before alkali dipping. In acid dipping, a hydrochloric acid solution is injected by the agent loading pump 18 to the second branch with a mass concentration of 2% and a duration of 3 hours. After acid dipping, the circulation pump 15 is started up to transmit the abandoned acid dipping liquid to a dedicated abandoned agent liquid disposal container via a bypass of the feed-liquid backflow channel 12. Then the circulation pump 15 halts, the reverse cleaning valve 5 is opened, the reverse cleaning pump 17 is started up, to perform reverse hydraulic cleaning on the membrane separation device 19 at a duration of 15 minutes. Afterwards, the reverse cleaning pump 17 halts, the reverse cleaning valve 5 is closed, and the circulation pump 15 is started up again to transmit the liquid in the membrane filter tank 9 all to the bioreaction tank 8. In the following alkali dipping, a sodium hypochlorite solution is injected by the agent loading pump 18 to the second branch with an effective chlorine concentration of 5000 mg/L at a soaking duration of 12 hours. The operations performed after acid dipping are repeated after alkali dipping. During acid dipping and alkali dipping, at the interval of 50 minutes, the membrane filter tank gas supplying valve 3 is opened for 10 minutes, and aeration is performed by the gas distributor 23 on the membrane filter tank 9 for 2 minutes, to enhance the cleaning effect. After alkali dipping, the feed-liquid supplying valve 1, the feed-liquid backflow valve 2, the membrane filter tank gas supplying valve 3 and the produced water valve 6 are opened, the reverse cleaning valve 5 and the forward cleaning valve 7 are closed, the reverse cleaning pump 17 and the agent loading pump 18 halt, and the circulation pump 15 and the outflow pump 16 are started up, then the wastewater treatment system is back to the normal operation state as shown in FIG. 6. Forward chemical cleaning is performed according to the situation of increasing of the membrane filtering resistance, generally once per 12 months that the membrane separation device 19 operates, and at a duration of 18 hours.

The Second Embodiment

Figure 3:
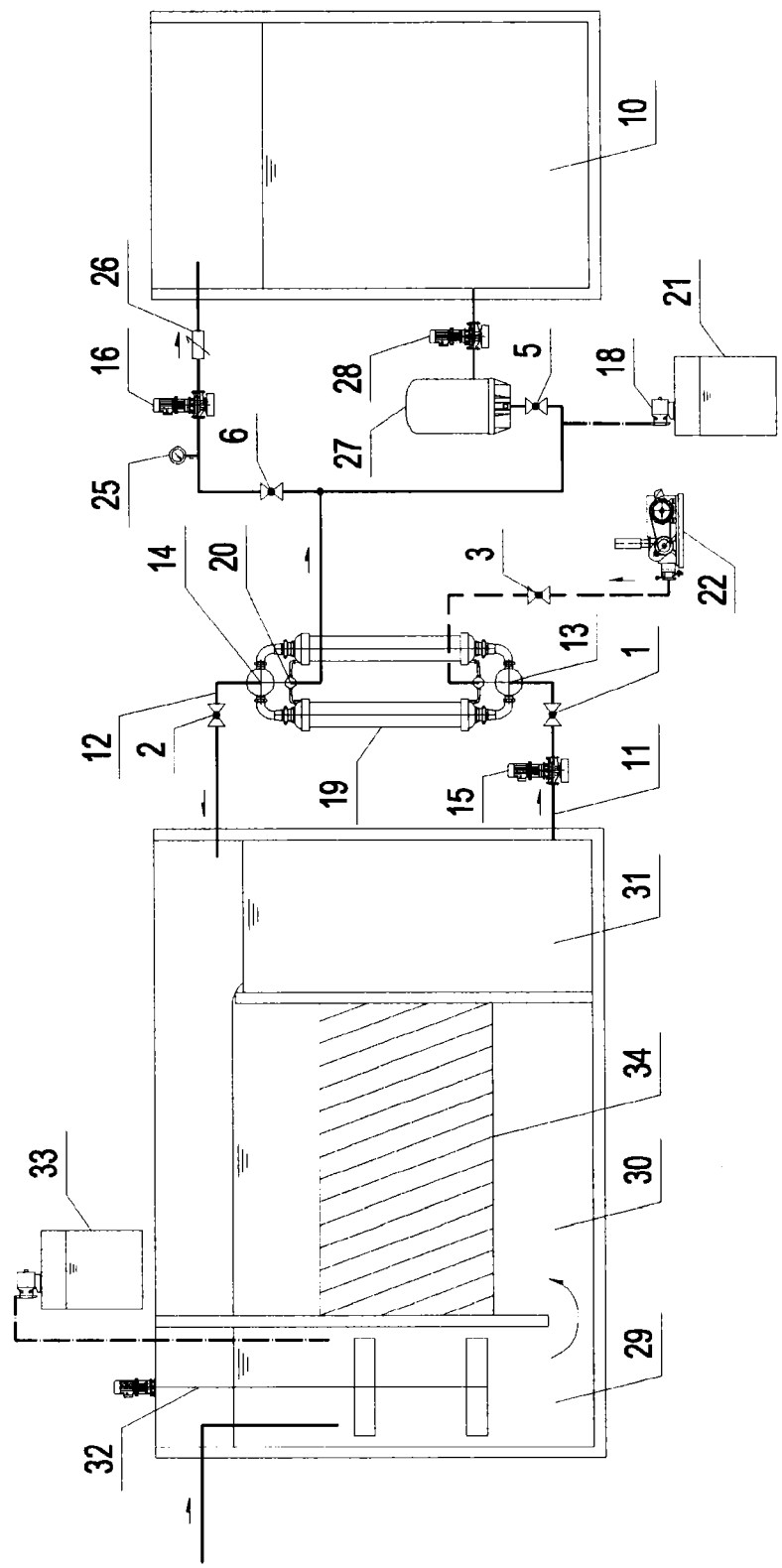
FIG. 3 is a structural diagram of an apparatus for cleaning a membrane separation device according to a second embodiment of the invention.
Figure 5:
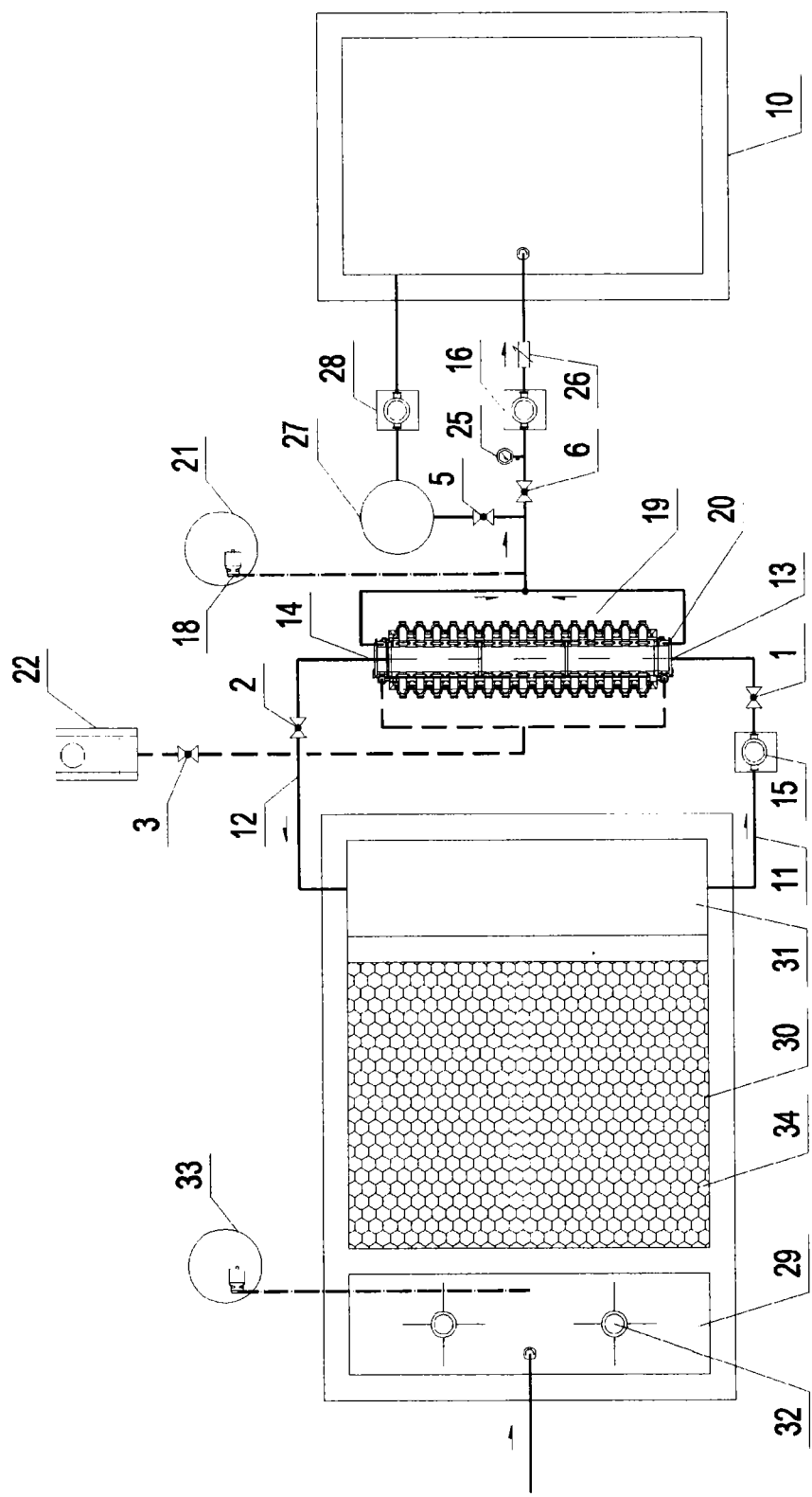
FIG. 5 is a plan view of the apparatus for cleaning a membrane separation device according to the second embodiment of the invention.

As shown in FIG. 3 and FIG. 5, as part of a drinking water treatment system, an apparatus for cleaning a membrane separation device includes a coagulation reaction tank 29; an inclined plate sedimentation tank 30; an intermediate water tank 31; a membrane separation device 19; a membrane permeating liquid tank 10; an stirrer 32 arranged in the coagulation reaction tank 29; an inclined plate 34 arranged in the inclined plate sedimentation tank 30; a feed-liquid supplying channel 11 for transmitting upper clear liquid in the intermediate water tank 31 to the membrane separation device 19 and a circulation pump 15 and a feed-liquid supplying valve 1 installed in the feed-liquid supplying channel 11, where the feed-liquid supplying channel 11 passes through the sidewall of the intermediate water tank 31 at a lower part of the sidewall with the top of the channel being 200 mm higher than the bottom of the tank; a feed-liquid backflow channel 12 for returning a concentrate in the membrane separation device 19 to the intermediate water tank 31; a feed-liquid backflow valve 2 installed in the feed-liquid backflow channel 12; a feed-liquid inlet 13, a feed-liquid outlet 14 and a membrane permeating liquid outlet 20 of the membrane separation device 19, where a channel that connects the membrane permeating liquid outlet 20 and the membrane permeating liquid tank 10 has two branches, a first branch is provided with a produced water valve 6, a pressure transducer 25 and an electromagnetic flux meter 26, and a second branch is connected with a water outlet of a pressure stabilizing tank 27 and is provided with a reverse cleaning valve 5, where a water inlet of the pressure stabilizing tank 27 is connected with a water outlet of a water compensation pump 28, and a water absorbing inlet of the water compensation pump 28 is connected with the membrane permeating liquid tank 10 via a channel; a blower 22 including a gas outlet connected with a gas distributor 23 installed in the membrane separation device 19 via a channel and is provided with a membrane filter tank gas supplying valve 3; an agent loading pump 18 installed right above an agent tank 21 cylindrically shaped and arranged next to the membrane permeating liquid tank 10, where a channel connected with an outlet of the agent loading pump 18 is connected to the second branch at a site on a main channel before the reverse cleaning valve 5 and the produced water valve 6; and a coagulation adding device 33 for adding a coagulant into the coagulation reaction tank 29.

The membrane separation device 19 consists of thirty hollow fiber columnar membrane modules arranged in two rows with fifteen in each row. Each hollow fiber columnar membrane module is sized $\Phi 225$ mm×1800 mm, and is integrated with seven hollow fiber membrane bundles. Each hollow fiber membrane bundle consists of 300 hollow fibers made of polyvinylidene fluoride, with an outer diameter of 1.35 mm and an average membrane pore of 0.1 μm. The both ends of the fibers are collected and cast in end parts using epoxy resin, and are secondarily cast using polyurethane so as to protect the root portions of fibers. The end parts are enclosed by produced water channels with an outer diameter of $\Phi 8$ mm. All produced water channels are connected in parallel to a main water collection channel.

The net inner size of the coagulation reaction tank 29 is 3 m (width)×2 m (length)×2.5 m (depth) with an effective depth of water of 2 m and an effective volume of 12 m³. The net inner size of the inclined plate sedimentation tank 30 is 3 m (width)×4 m (length)×2.5 m (depth) with an effective depth of water of 2 m and an effective volume of 24 m³. The net inner size of the intermediate water tank 31 is 3 m (width)×2 m (length)×2.5 m (depth) with an effective depth of water of 1.8 m and an effective volume of 10.8 m³. The net inner size of the produced water tank 10 is 3 m (width)×5 m (length)×3.5 m (depth) with an effective depth of water of 3 m and an effective volume of 45 m³.

The circulation pump 15 has a flux of 120 m³/h, a lift of 11 m and a power of 5.5 kw, the outflow pump 16 has a flux of 50 m³/h, a lift of 20 m and a power of 5.5 kw, the agent loading pump 18 has a flux of 1.5 m³/h, a lift of 8 m and a power of 90 kw, the agent tank 21 is sized $\Phi 1000$ mm×1500 mm and has an effective volume of 1000 L, the blower 22 has a wind flux of 0.63 m³/min, a wind pressure of 30 kPa and a power of 0.75 kW, the pressure stabilizing tank 21 is sized $\Phi 2400$ mm×3000 mm and has an adjustable volume of 3 m³, the water compensation pump 28 has a flux of 25 m³/h, a lift of 31.5 m and a power of 5.5 kw, the stirrer 32 is an upright stirrer with a power of 0.37 kW, and the inclined plate 34 has a slope length of 1.2 m, a slope angle of 60°, a bottom retention height of 1 m and a planar size the same as the inclined plate sedimentation tank 30.

The feed-liquid supplying channel 11 and the feed-liquid backflow channel 12 both have an inner diameter of 200 mm, and the feed-liquid valve 1, the feed-liquid backflow valve 2, the membrane filter tank gas supplying valve 3, the reverse cleaning valve 5 and the produced water valve 6 are all electrical valves.

When raw water is general surface water, its main indexes include: pH=6~9, turbidity=500~1000 NTU, $COD_{Mn}$=10~20 mg/L and ammonia nitrogen=1~2 mg/L. For this kind of raw water, the drinking water treatment system according to the present embodiment has a processing capability of 50 m³/h and a daily processing scale of 12000 m³/d, and the coagulation reaction tank 29 has a hydraulic retention time of approximately 14.4 minutes, the inclined plate sedimentation tank 30 has a hydraulic retention time of approximately 28.8 minutes and a surface load of 4.16 m³/(m2·h), the intermediate water tank 31 has a hydraulic retention time of approximately 14.4 minutes, and the produced water tank 10 has a hydraulic retention time of approximately 0.9 hour.

The raw water firstly enters the coagulation reaction tank 29, and the coagulant adding device 33 adds aluminum sulfate as a coagulant into the coagulation reaction tank 29. By the stirring of the stirrer 32, the coagulant is mixed sufficiently with the raw water and forms tiny floccules. The raw water carries the floccules to enter the inclined plate sedimentation tank 30 via guiding holes at the bottom of an isolation wall between the coagulation reaction tank 29 and the inclined plate sedimentation tank 30. The water flow in the inclined plate sedimentation tank 30 is ascending, and the floccules are blocked by the inclined plate 34, resulting in upper clear liquid at an upper part of the inclined plate 34. The upper clear liquid falls into the intermediate water tank 31 from the top of an isolation wall between the inclined plate sedimentation tank 30 and the intermediate water tank 31. The circulation pump 15 transmits the upper clear liquid in the intermediate water tank 31 to the feed-liquid inlet 13 of the membrane separation device 19 via the feed-liquid supplying channel 11, and under the negative pressure provided by the outflow pump 16, most of the upper clear liquid passes through the hollow fiber membrane modules in the membrane separation device 19 and enters inner cavities of the hollow fiber membrane modules. A conflux of the membrane permeating liquid is transmitted to the membrane permeating liquid tank 10 from the membrane permeating liquid outlet 20 via the outflow pump 16, and the concentrate which is a fraction of the upper clear liquid flows back to the intermediate water tank 31 from the feed-liquid outlet 14 of the membrane separation device 19 via the feed-liquid backflow channel 12.

The method for online cleaning the membrane separation device 19 is similar to that of the first embodiment. However, this embodiment does not have the bioreaction tank gas supplying valve 4 and the forward cleaning valve 7, and uses the pressure stabilizing tank 27 and the water compensation pump 28 instead of the reverse cleaning pump 17 in the first embodiment.

The method and apparatus for cleaning a membrane separation device according to the invention are described above. The principle and applications of the invention are explained in connection with particular embodiments. Those skilled in the art can make modifications to the embodiments and their applications in light of the spirit of the invention. Therefore, the disclosure herein should not be interpreted to limit the scope of the invention.

The invention claimed is:

1. A method for cleaning a membrane separation device, comprising the processes of:
   a) performing forward hydraulic cleaning to have a gas, liquid or gas-liquid mixture wash an outer surface of a filter unit at a predetermined velocity, when the ratio of membrane filtering resistance to an initial membrane filtering resistance is smaller than 1.2;
   performing process a) and then b) performing reverse hydraulic cleaning to have a gas, liquid or gas-liquid mixture permeate the filter unit in a direction opposite to a normal working filtering direction of the filter unit at a predetermined flux and a predetermined duration, when the ratio of the membrane filtering resistance to the initial membrane filtering resistance increases to be larger than or equal to 1.2 but less than 2;
   sequentially performing processes a) and b) and then c) performing reverse chemical cleaning to have a cleaning solution containing a chemical agent permeate the filter unit in the direction opposite to the normal working filtering direction of the filter unit at a predetermined flux and a predetermined duration, when the ratio of the membrane filtering resistance to the initial membrane filtering resistance increases to be larger than or equal to 2 but less than 3; and sequentially performing processes a), b) and c) and then d) performing forward chemical cleaning to have a cleaning solution containing a chemical agent soak the outer surface of the filter unit for a period of time, when the ratio of the membrane filtering resistance to the initial membrane filtering resistance increases to be larger than or equal to 3.

2. The method for cleaning a membrane separation device according to claim 1, wherein the forward hydraulic cleaning in process a) is realized by: having the membrane separation device operate in a cross-flow filtration mode; and using continuously cross flow of the gas, liquid or gas-liquid mixture on the outer surface of the filter unit as forward hydraulic cleaning.

3. The method for cleaning a membrane separation device according to claim 1, wherein the velocity in process a) ranges from 0.01 to 2 m/s.

4. The method for cleaning a membrane separation device according to claim 1, wherein the ratio of the membrane filtering resistance to the initial membrane filtering resistance is smaller than 1.2, the membrane separation device operates in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 30 minutes and the ratio of inoperative time to the total time period ranging from 5 to 20%.

5. The method for cleaning a membrane separation device according to claim 1, wherein the ratio of the membrane filtering resistance to the initial membrane filtering resistance is larger than or equal to 1.2 but less than 2, the membrane separation device continues to operate in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 30 minutes and the ratio of inoperative time to the total time period ranging from 5 to 20%; and process b) is applied during the inoperative time of the membrane separation device in any one cycle of every 1 to 100 cycles, and a medium in process b) is membrane permeating liquid of the membrane separation device.

6. The method for cleaning a membrane separation device according to claim 1, wherein the ratio of the membrane filtering resistance to the initial membrane filtering resistance is larger than or equal to 2 but less than 3, the membrane separation device continues to operate in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 30 minutes and the ratio of inoperative time to the total time period ranging from 5 to 20%; process b) is applied during the inoperative time of the membrane separation device in any one cycle of every 1 to 100 cycle, and a medium in process b) is membrane permeating liquid of the membrane separation device; and chemical enhanced backwashing is performed during the inoperative time of the membrane separation device in any one cycle of every 100 to 10000 cycles, the membrane separation device halts for the 5 to 30 consecutive cycles, and process c) is applied to the membrane separation device.

7. The method for cleaning a membrane separation device according to claim 1, wherein whether to apply process b) or c) is determined by monitoring dynamically a varying cycle of variation of transmembrane pressure or the membrane filtering resistance.

8. The method for cleaning a membrane separation device according to claim 1, wherein the flux in process b) is 1 to 5 times as much as a membrane flux in the case that the filter unit is in normal operation, and the duration in process b) is less than or equal to 5 minutes.

9. The method for cleaning a membrane separation device according to claim 1, wherein the ratio of a total volume of the cleaning solution permeating the filter unit in the direction opposite to the normal working filtering direction of the filter unit in process c) to a total filter area of the filter unit ranges from 1 to 20 L/m$^2$.

10. The method for cleaning a membrane separation device according to claim 1, wherein in process c) the cleaning solution permeates the filter unit in the direction opposite to the normal working filtering direction of the filter unit in at least two batches, a settling interval between every two of the batches ranges from 30 to 120 minutes.

11. The method for cleaning a membrane separation device according to claim 1, wherein two cleaning solutions, an acid dipping solution and an alkali dipping solution, are used for acid dipping and alkali dipping in process c), and are both used in process d), the acid dipping solution is any one of or a mixture of any two or more of: a citric acid solution, an oxalic acid solution, a hydrochloric acid solution and a sulfuric acid solution, and the alkali dipping solution is a sodium hypochlorite solution, a sodium hydroxide solution, or a mixture of a sodium hypochlorite solution and a sodium hydroxide solution.

12. The method for cleaning a membrane separation device according to claim 11, wherein in processes c) and d), acid dipping and alkali dipping both are performed once, and acid dipping is performed first and alkali dipping is performed secondly.

13. The method for cleaning a membrane separation device according to claim 11, wherein in process c), a pH value of the acid dipping solution ranges from 1 to 4; an effective chlorine concentration of the sodium hypochlorite solution ranges from 50 to 3000 mg/L; and a pH value of the sodium hypochlorite solution or the mixture of the sodium hypochlorite solution and the sodium hydroxide solution ranges from 8 to 14.

14. The method for cleaning a membrane separation device according to claim 11, wherein in process d), a pH value of the acid dipping solution ranges from 1 to 4; an effective chlorine concentration of the sodium hypochlorite solution ranges from 1000 to 6000 mg/L; and a pH value of the sodium hypochlorite solution or the mixture of the sodium hypochlorite solution and the sodium hydroxide solution ranges from 8 to 14.

15. The method for cleaning a membrane separation device according to claim 11, wherein in process d), a duration of acid dipping ranges from 1 to 48 hours; and a duration of alkali dipping ranges from 1 to 48 hours.

16. The method for cleaning a membrane separation device according to claim 1, wherein the forward hydraulic cleaning in process a) is realized by: having the membrane separation device operate in a cross-flow filtration mode; and using continuously cross flow of a mixture of liquid to be filtered and a gas on the outer surface of the filter unit resulting from aeration as forward hydraulic cleaning.

17. The method for cleaning a membrane separation device according to claim 1, wherein the ratio of the membrane filtering resistance to the initial membrane filtering resistance is smaller than 1.2, the membrane separation device operates in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 15 minutes and the ratio of the inoperative time to the total time period ranging from 5 to 10%.

18. The method for cleaning a membrane separation device according to claim 1, wherein the ratio of the membrane filtering resistance to the initial membrane filtering resistance is larger than or equal to 1.2 but less than 2, the membrane separation device continues to operate in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 30 minutes and the ratio of inoperative time to the total time period ranging from 5 to 20%; and process b) is applied during the inoperative time of the membrane separation device in any one cycle of every 4 to 24 cycles, and a medium in process b) is membrane permeating liquid of the membrane separation device.

19. The method for cleaning a membrane separation device according to claim 1, wherein the ratio of the membrane filtering resistance to the initial membrane filtering resistance is larger than or equal to 2 but less than 3, the membrane separation device continues to operate in a cross-flow filtration mode, cross flow of liquid to be filtered or a mixture of the liquid to be filtered and a gas on the outer surface of the filter unit is used continuously as forward hydraulic cleaning, and the membrane separation device operates intermittently in cycles with a fixed time period, the time period ranging from 5 to 30 minutes and the ratio of inoperative time to the total time period ranging from 5 to 20%; process b) is applied during the inoperative time of the membrane separation device in any one cycle of every 1 to 100 cycle, and a medium in process b) is membrane permeating liquid of the membrane separation device; and for any 5 to 30 consecutive cycles of every 100 to 10000 cycles, the membrane separation device halts for the 5 to 30 consecutive cycles, and process c) is applied to the membrane separation device.

20. The method for cleaning a membrane separation device according to claim 1, wherein whether to apply process b) or c) is determined by monitoring dynamically a varying cycle of variation of a rate at which the transmembrane pressure or the membrane filtering resistance increases.

* * * * *